United States Patent
Meylan et al.

(10) Patent No.: US 11,968,674 B2
(45) Date of Patent: Apr. 23, 2024

(54) CONTROLLING MODEM MEMORY USED BY UPLINK DATA

(71) Applicant: QUALCOMM Incorporated, San Diego, CA (US)

(72) Inventors: Arnaud Meylan, San Diego, CA (US); Sitaramanjaneyulu Kanamarlapudi, San Diego, CA (US); Vishal Dalmiya, San Diego, CA (US); Kuo-Chun Lee, San Diego, CA (US); Shailesh Maheshwari, San Diego, CA (US); Vaishakh Rao, San Diego, CA (US); Arun Prasanth Balasubramanian, San Diego, CA (US); Subashini Krishnamurthy, San Diego, CA (US); Leena Zacharias, San Jose, CA (US); Sivashankar Sekar, Hyderabad (IN); Saket Bathwal, Hyderabad (IN); Liangchi Hsu, San Diego, CA (US); Raghuveer Ramakrishna Srinivas Tarimala, Hyderabad (IN)

(73) Assignee: QUALCOMM Incorporated, San Diego, CA (US)

(*) Notice: Subject to any disclaimer, the term of this patent is extended or adjusted under 35 U.S.C. 154(b) by 248 days.

(21) Appl. No.: 17/167,762

(22) Filed: Feb. 4, 2021

(65) Prior Publication Data

US 2022/0248442 A1 Aug. 4, 2022

(51) Int. Cl.
*H04W 72/21* (2023.01)
*H04L 5/00* (2006.01)
(Continued)

(52) U.S. Cl.
CPC ............ *H04W 72/21* (2023.01); *H04L 5/0053* (2013.01); *H04W 24/10* (2013.01); *H04W 72/23* (2023.01)

(58) Field of Classification Search
CPC ......... H04W 72/1284; H04W 72/0413; H04W 72/042; H04W 24/10; H04L 5/0053
(Continued)

(56) References Cited

U.S. PATENT DOCUMENTS

| 2005/0078651 A1* | 4/2005 | Lee ........................ H04L 47/30 370/349 |
| 2009/0185528 A1* | 7/2009 | Sambhwani .......... H04L 1/1874 370/329 |

(Continued)

OTHER PUBLICATIONS

Huawei., et al., "Soft Buffer Management in NR and LTE-NR DC", 3GPP TSG RAN WG1 Meeting 91, 3GPP Draft, R1-1719399, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017, Nov. 18, 2017 (Nov. 18, 2017), 6 Pages, XP051369308, Retrieved from the Internet: URL: https://www.3gpp.org/ftp/tsg_ran/WG1_RL1/TSGR1_91/Docs/, [retrieved on Nov. 18, 2017] p. 2, Proposal 1, p. 2, section 2.2.

(Continued)

*Primary Examiner* — Chi Tang P Cheng
(74) *Attorney, Agent, or Firm* — Holland & Hart LLP

(57) ABSTRACT

Methods, systems, and devices for wireless communications are described. A user equipment (UE) may receive, from a base station, a control message indicating a resource configuration for uplink and downlink transmissions. The UE may determine an uplink buffer threshold for a modem buffer of the UE based on the resource configuration. The UE may transmit, to the base station, a feedback request message requesting that the base station provide feedback for at least one previously transmitted uplink packet based on a comparison of an amount of previously transmitted uplink data and scheduled uplink data stored in the modem buffer relative to the uplink buffer threshold. The UE may
(Continued)

receive, based on transmitting the feedback request message, a feedback response message corresponding to a first previously transmitted uplink packet of the at least one previously transmitted uplink packet.

29 Claims, 13 Drawing Sheets

(51) Int. Cl.
*H04W 24/10* (2009.01)
*H04W 72/23* (2023.01)

(58) Field of Classification Search
USPC .......................................................... 370/329
See application file for complete search history.

(56) References Cited

U.S. PATENT DOCUMENTS

| 2014/0274011 | A1* | 9/2014 | Jain ......................... H04W 8/22 |
| | | | 455/418 |
| 2014/0286316 | A1* | 9/2014 | Park ....................... H04W 76/16 |
| | | | 370/332 |
| 2018/0146391 | A1* | 5/2018 | Bergquist ............... H04L 1/1887 |
| 2018/0367463 | A1* | 12/2018 | Jose ......................... H04L 47/32 |
| 2020/0077462 | A1* | 3/2020 | Shi ...................... H04L 41/0681 |

OTHER PUBLICATIONS

Partial International Search Report—PCT/US2022/011136—ISA/EPO—dated May 9, 2022.
International Search Report and Written Opinion—PCT/US2022/011136—ISA/EPO—dated Jun. 30, 2022.

* cited by examiner

CONTROLLING MODEM MEMORY USED BY UPLINK DATA

FIELD OF TECHNOLOGY

The following relates to wireless communications, including controlling modem memory used by uplink data.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). A UE may include a modem buffer for supporting uplink and downlink transmissions. For example, the modem buffer may include available memory for supporting uplink data and downlink data.

SUMMARY

The described techniques relate to improved methods, systems, devices, and apparatuses that support controlling modem memory used by uplink data. A user equipment (UE) may include a modem buffer for supporting uplink and downlink transmissions. For example, the modem buffer may store previously transmitted uplink data or uplink data scheduled for transmission. In some examples, the modem buffer may store received downlink data prior to forwarding to an upper layer. In some cases, the UE may retain a copy of previously transmitted uplink data in a memory of the modem buffer until the UE receives a corresponding feedback message (e.g., positive acknowledgement (ACK), negative acknowledgement (NACK)) from a receiving device (e.g., a base station). Once a feedback message is received, the UE may remove the previously transmitted uplink data from the modem in response to receiving a corresponding ACK. Alternatively, the UE may retransmit the previously transmitted uplink data in response to receiving a corresponding NACK.

A UE may wirelessly communicate with other UEs or base stations over one or more carriers, where each carrier may include a portion of a radio frequency spectrum band operated according to one or more physical layer channels for a given radio access technology (e.g., a Long Term Evolution (LTE), an LTE-Advanced (LTE-A), LTE-A Pro, New Radio (NR)). However, communication using radio access technologies (e.g., NR) supportive of relatively higher data rates may lead to an increase in the amount of uplink data stored in the modem buffer waiting to be acknowledged. In some aspects, conditions such as a noisy (e.g., noise above a threshold) wireless channel may reduce the number of successful transmissions between devices (e.g., the UE and a base station, the UE and another UE), further increasing the amount of uplink data stored in the modem buffer and waiting to be acknowledged. In an example, the amount of uplink data stored in the modem buffer may exceed the storage size of the modem buffer. As the amount of uplink data (e.g., scheduled uplink data and previously transmitted uplink data) stored in the modem buffer increases, the available memory for supporting downlink traffic is reduced, which may negatively impact downlink throughput at the UE.

Example techniques are described herein for controlling the amount of modem memory used by uplink data. A UE may receive, from a base station, a control message indicating a resource configuration for uplink and downlink transmissions. The UE may determine an uplink buffer threshold for a modem buffer of the UE based on the resource configuration. In some aspects, the resource configuration may indicate time and frequency resources allocated to the UE by the base station for uplink and downlink transmissions. In an example, when the amount of uplink data (e.g., previously transmitted uplink data and scheduled uplink data) stored in the modem buffer exceeds the uplink buffer threshold, the UE may transmit, to the base station, a feedback request message requesting that the base station provide feedback for a previously transmitted uplink packet. The UE may remove the previously transmitted uplink packet from the modem buffer in response to receiving a feedback message (e.g., ACK) indicating that the base station successfully received the previously transmitted uplink packet. Alternatively, the UE may retransmit the previously transmitted uplink packet in response to receiving a feedback message (e.g., NACK) indicating that the base station did not successfully receive the previously transmitted uplink packet.

The UE may perform additional operations to manage the inflow of uplink data to the modem buffer when the uplink buffer threshold is exceeded. For example, the UE may increase a feedback rate at which the UE transmits feedback request messages to the base station (e.g., enable fast polling) to prompt the base station to respond with feedback messages. In an example, when the amount of uplink data (e.g., previously transmitted uplink data and scheduled uplink data) stored in the modem buffer exceeds the uplink buffer threshold, the UE may transmit a disable command to an application host (also referred to herein as a host) of the UE requesting that the application host stop forwarding uplink data to the modem buffer. In another example, when the amount of uplink data (e.g., previously transmitted uplink data and scheduled uplink data) stored in the modem buffer is less than the uplink buffer threshold, the UE may transmit an enable command to the application host requesting that the application host forward (e.g., reenable forwarding of) the uplink data to the modem buffer.

A method for wireless communication at a user equipment (UE) is described. The method may include receiving, from a base station, a control message indicating a resource configuration for uplink and downlink transmissions and determining an uplink buffer threshold for a modem buffer of the UE based on the resource configuration.

An apparatus for wireless communication at a UE is described. The apparatus may include a processor, memory in electronic communication with the processor, and instructions stored in the memory. The instructions may be executable by the processor to cause the apparatus to receive, from a base station, a control message indicating a resource configuration for uplink and downlink transmissions and determine an uplink buffer threshold for a modem buffer of the UE based on the resource configuration.

Another apparatus for wireless communication at a UE is described. The apparatus may include means for receiving, from a base station, a control message indicating a resource configuration for uplink and downlink transmissions and means for determining an uplink buffer threshold for a modem buffer of the UE based on the resource configuration.

A non-transitory computer-readable medium storing code for wireless communication at a UE is described. The code may include instructions executable by a processor to receive, from a base station, a control message indicating a resource configuration for uplink and downlink transmissions and determine an uplink buffer threshold for a modem buffer of the UE based on the resource configuration.

Some examples of the method, apparatuses, and non-transitory computer-readable medium described herein may further include operations, features, means, or instructions for transmitting, to the base station, a feedback request message requesting that the base station provide feedback for at least one previously transmitted uplink packet based on a comparison of an amount of previously transmitted uplink data and scheduled uplink data stored in the modem buffer relative to the uplink buffer threshold.

In some examples of the method, apparatuses, and non-transitory computer-readable medium described herein, transmitting the feedback request message may include operations, features, means, or instructions for transmitting the feedback request message in accordance with a feedback request rate that may be adjusted based on the amount of previously transmitted uplink data and scheduled uplink data satisfying the uplink buffer threshold, where the adjusted feedback request rate may be different from an initial feedback request rate configured by radio resource control (RRC) signaling.

Some examples of the method, apparatuses, and non-transitory computer-readable medium described herein may further include operations, features, means, or instructions for transmitting a set of multiple feedback request messages in accordance with the adjusted feedback request rate, the set of multiple feedback request messages including the feedback request message.

Some examples of the method, apparatuses, and non-transitory computer-readable medium described herein may further include operations, features, means, or instructions for receiving, in accordance with the adjusted feedback request rate, a set of multiple feedback response messages corresponding to the set of multiple feedback request messages.

Some examples of the method, apparatuses, and non-transitory computer-readable medium described herein may further include operations, features, means, or instructions for retransmitting at least one previously transmitted uplink packet, prior to receiving a feedback response message corresponding to a feedback request message requesting that the base station provide feedback for the at least one previously transmitted uplink packet, where a copy of the at least one previously transmitted uplink packet may be stored in the modem buffer.

In some examples of the method, apparatuses, and non-transitory computer-readable medium described herein, retransmitting the at least one previously transmitted uplink packet may include operations, features, means, or instructions for retransmitting the at least one previously transmitted uplink packet via one or more radio bearers.

In some examples of the method, apparatuses, and non-transitory computer-readable medium described herein, retransmitting the at least one previously transmitted uplink packet may include operations, features, means, or instructions for retransmitting the at least one previously transmitted uplink packet during a transmission window.

Some examples of the method, apparatuses, and non-transitory computer-readable medium described herein may further include operations, features, means, or instructions for storing a copy of each packet of the at least one previously transmitted uplink packet transmitted during the transmission window.

Some examples of the method, apparatuses, and non-transitory computer-readable medium described herein may further include operations, features, means, or instructions for receiving a feedback response message corresponding to the at least one previously transmitted uplink packet and removing the at least one previously transmitted uplink packet from the modem buffer based on the feedback response message.

Some examples of the method, apparatuses, and non-transitory computer-readable medium described herein may further include operations, features, means, or instructions for transmitting a disable command to a host of the UE requesting that the host stop forwarding uplink data to the modem buffer, pausing read or write operations at the modem buffer, or both, based on an amount of uplink data stored in the modem buffer satisfying the uplink buffer threshold.

Some examples of the method, apparatuses, and non-transitory computer-readable medium described herein may further include operations, features, means, or instructions for transmitting an enable command to a host of the UE requesting that the host forward uplink data to the modem buffer for transmission based on an amount of uplink data stored in the modem buffer failing to satisfy the uplink buffer threshold.

Some examples of the method, apparatuses, and non-transitory computer-readable medium described herein may further include operations, features, means, or instructions for adjusting a feedback request rate based on the amount of uplink data stored in the modem buffer failing to satisfy the uplink buffer threshold.

In some examples of the method, apparatuses, and non-transitory computer-readable medium described herein, determining the uplink buffer threshold may include operations, features, means, or instructions for determining the uplink buffer threshold based on a memory size of the modem buffer.

In some examples of the method, apparatuses, and non-transitory computer-readable medium described herein, determining the uplink buffer threshold may include operations, features, means, or instructions for determining the uplink buffer threshold based on a throughput, a priority, or a latency, or any combination thereof, associated with uplink transmissions, downlink transmissions, or both, where at least one of the throughput, the priority, or the latency may be indicated in the resource configuration or via a host of the UE.

In some examples of the method, apparatuses, and non-transitory computer-readable medium described herein, determining the uplink buffer threshold may include operations, features, means, or instructions for determining the uplink buffer threshold based on an uplink application data throughput, a downlink application data throughput, or both, for an application of the UE.

Some examples of the method, apparatuses, and non-transitory computer-readable medium described herein may further include operations, features, means, or instructions for transmitting a release command for a first cell group based on an amount of previously transmitted uplink data and scheduled uplink data stored in the modem buffer satisfying the uplink buffer threshold.

Some examples of the method, apparatuses, and non-transitory computer-readable medium described herein may further include operations, features, means, or instructions for retransmitting, via a second cell group, a first uplink packet of at least one previously transmitted uplink packet that was previously transmitted via the first cell group based on the release command.

Some examples of the method, apparatuses, and non-transitory computer-readable medium described herein may further include operations, features, means, or instructions for transmitting a first measurement result for a first cell group that includes an adjustment to a second measurement result for the first cell group based on an amount of previously transmitted uplink data and scheduled uplink data stored in the modem buffer satisfying the uplink buffer threshold.

Some examples of the method, apparatuses, and non-transitory computer-readable medium described herein may further include operations, features, means, or instructions for transmitting an unmodified measurement result for a first cell group based on an amount of previously transmitted uplink data and scheduled uplink data stored in the modem buffer failing to satisfy the uplink buffer threshold.

Some examples of the method, apparatuses, and non-transitory computer-readable medium described herein may further include operations, features, means, or instructions for transmitting a reestablishment request for a cell group based on an amount of previously transmitted uplink data and scheduled uplink data stored in the modem buffer failing to satisfy the uplink buffer threshold.

DETAILED DESCRIPTION

Figure 1:
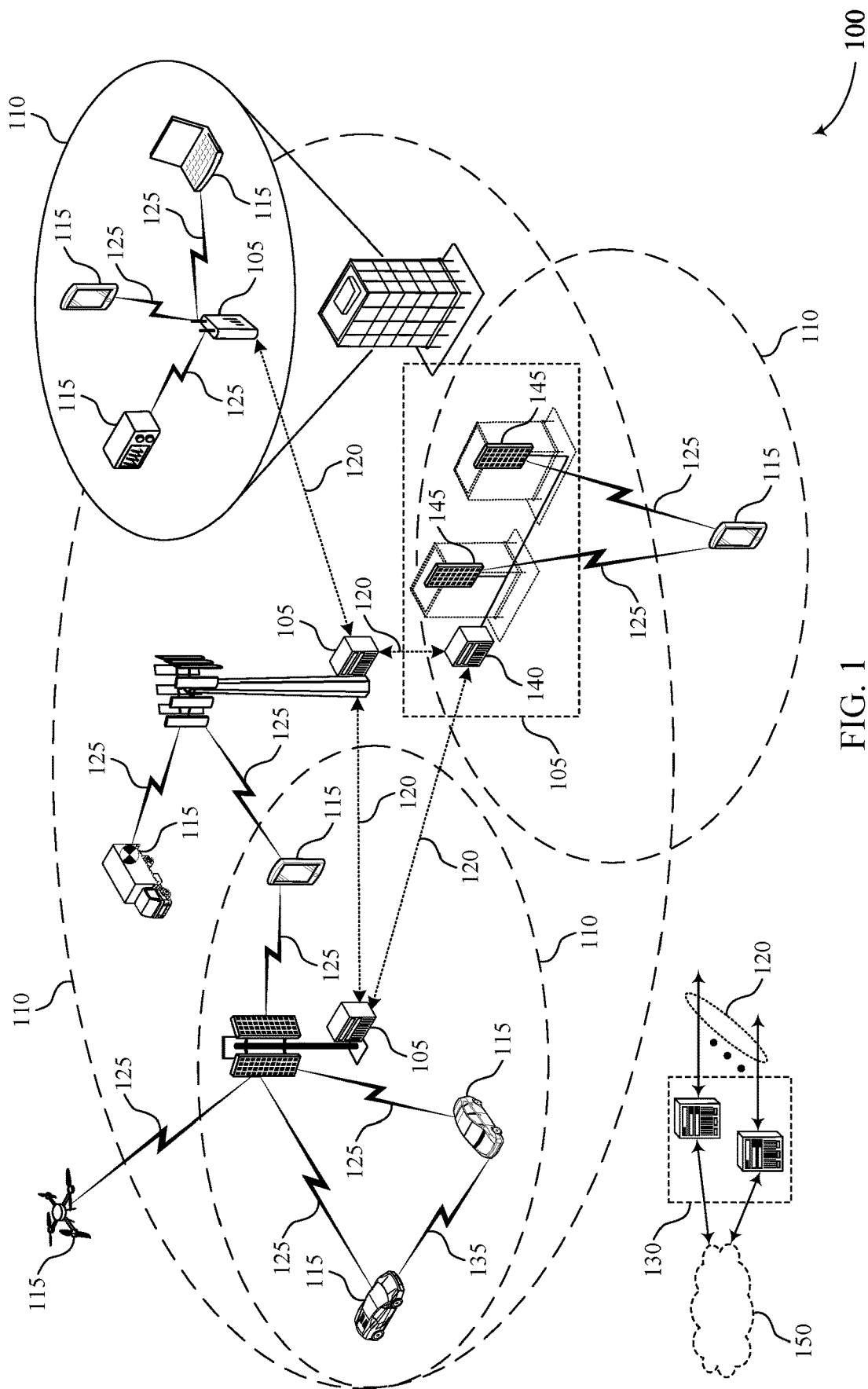
FIG. 1 illustrates an example of a wireless communications system that supports controlling modem memory used by uplink data in accordance with aspects of the present disclosure.

The described techniques relate to improved methods, systems, devices, and apparatuses that support controlling modem memory used by uplink data. A user equipment (UE) may include a modem buffer for supporting uplink and downlink transmissions. For example, the modem buffer may store previously transmitted uplink data, uplink data scheduled for transmission, or both. In some examples, the modem buffer may store received downlink data prior to forwarding to an upper layer of the UE. In some cases, the UE may retain previously transmitted uplink data in a memory of the modem buffer until the UE receives a corresponding feedback message (e.g., positive acknowledgement (ACK), negative acknowledgement (NACK)) from a receiving device (e.g., a base station). Once a feedback message is received, the UE may remove the previously transmitted uplink data from the modem in response to receiving a corresponding ACK. In some examples, the UE may retransmit the previously transmitted uplink data in response to receiving a corresponding NACK.

A UE may wirelessly communicate with other UEs or base stations over one or more carriers, where each carrier may include a portion of a radio frequency spectrum band operated according to one or more physical layer channels for a given radio access technology (e.g., LTE, LTE-A, LTE-A Pro, NR). However, communication using radio access technologies (e.g., NR) supportive of relatively higher data rates may lead to an increase in the amount of uplink data stored in the modem buffer waiting to be acknowledged. In some aspects, conditions such as a noisy (e.g., noise above a threshold) wireless channel may reduce the number of successful transmissions between devices (e.g., the UE and a base station, the UE and another UE), further increasing the amount of uplink data stored in the modem buffer and waiting to be acknowledged. In an example, the amount of uplink data stored in the modem buffer may exceed the storage size of the modem buffer. As the amount of uplink data (e.g., scheduled uplink data and previously transmitted uplink data) stored in the modem buffer increases, the available memory for supporting downlink traffic is reduced, which may negatively impact downlink throughput at the UE.

Example techniques are described herein for controlling the amount of modem memory used by uplink data. A UE may receive, from a base station, a control message indicating a resource configuration for uplink and downlink transmissions. The UE may determine an uplink buffer threshold for a modem buffer of the UE based on the resource configuration. In some aspects, the resource configuration may indicate time and frequency resources allocated to the UE by the base station for uplink and downlink transmissions.

In an example, the resource configuration may indicate a configured throughput (e.g., peak rate possible), a priority, or a latency for the uplink transmissions, the downlink transmissions, or both. The resource configuration may, for example, specify a transmission time interval (TTI) structure (e.g., a subframe or slot structure) indicating a first defined number of uplink symbol periods, a second defined number of downlink symbol periods, or both. The UE may determine the uplink buffer threshold based on the configured throughput (e.g., peak rate possible), the priority, or the latency for the uplink transmissions. In some aspects, the UE may determine the uplink buffer threshold based on the configured throughput (e.g., peak rate possible), the priority, or the latency for the downlink transmissions. In an example, the UE may determine the uplink buffer threshold based on the respective throughputs, priorities, or latencies for the uplink transmissions and/or the downlink transmissions, for example, in combination with the total memory of the modem buffer.

In some aspects, when the amount of uplink data (e.g., previously transmitted uplink data and scheduled uplink data) stored in the modem buffer exceeds the uplink buffer threshold, the UE may transmit, to the base station, a feedback request message requesting that the base station provide feedback for a previously transmitted uplink packet. The UE may remove the previously transmitted uplink packet from the modem buffer in response to receiving a feedback message (e.g., ACK) indicating that the base station successfully received the previously transmitted uplink packet. In some examples, the UE may retransmit the previously transmitted uplink packet in response to receiving a feedback message (e.g., NACK) indicating that the base station did not successfully receive the previously transmitted uplink packet.

The UE may perform additional operations to manage the inflow of uplink data to the modem buffer when the uplink buffer threshold is exceeded. For example, the UE may increase a feedback rate at which the UE transmits feedback request messages to the base station (e.g., enable fast polling) to prompt the base station to respond with feedback messages. In an example, based on the increased quantity (number) of feedback request messages, the UE may receive feedback messages at an increased rate. Accordingly, the UE may remove successfully received uplink packets from the modem buffer at an increased rate.

In an example, when the amount of uplink data (e.g., previously transmitted uplink data and scheduled uplink data) stored in the modem buffer exceeds the uplink buffer threshold, the UE may transmit a disable command to an application host (also referred to herein as a host) of the UE requesting that the application host stop forwarding uplink data to the modem buffer. In some examples, when the amount of uplink data (e.g., previously transmitted uplink data and scheduled uplink data) stored in the modem buffer is less than the uplink buffer threshold, the UE may transmit an enable command to the application host requesting that the application host forward the uplink data (e.g., reenable forwarding of the uplink data) to the modem buffer. In some examples, the UE may readjust (e.g., decrease) the feedback rate when the amount of uplink data (e.g., previously transmitted uplink data and scheduled uplink data) is less than the uplink buffer threshold.

Aspects of the disclosure are initially described in the context of wireless communications systems. Examples of processes and signaling exchanges that support controlling modem memory used by uplink data are then described. Aspects of the disclosure are further illustrated by and described with reference to apparatus diagrams, system diagrams, and flowcharts that relate to controlling modem memory used by uplink data.

FIG. 1 illustrates an example of a wireless communications system 100 that supports controlling modem memory used by uplink data in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a TTI. In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

According to examples of aspects described herein, a UE 115 may receive a control message from a base station 105. The control message may indicate a resource configuration for uplink and downlink transmissions. The UE 115 may determine an uplink buffer threshold for a modem buffer of the UE 115 based on the resource configuration. In some aspects, the resource configuration may indicate time and frequency resources allocated to the UE 115 by the base station 105 for uplink and downlink transmissions.

In an example, the resource configuration may indicate a configured throughput (e.g., peak rate possible), a priority, or a latency for the uplink transmissions. In some examples, the resource configuration may indicate a configured throughput (e.g., peak rate possible), a priority, or a latency for the downlink transmissions. The UE 115 may determine the uplink buffer threshold based on the configured throughput (e.g., peak rate possible), the priority, or the latency for the uplink transmissions. In some aspects, the UE 115 may determine the uplink buffer threshold based on the configured throughput (e.g., peak rate possible), the priority, or the latency for the downlink transmissions. In an example, the UE 115 may determine the uplink buffer threshold based on the respective throughputs, priorities, or latencies for the uplink transmissions or the downlink transmissions, for example, in combination with the total memory (e.g., total memory size) of the modem buffer.

In some aspects, the UE 115 may transmit a feedback request message to the base station 105, requesting the base station 105 provide feedback for a previously transmitted uplink packet. For example, when the amount of uplink data (e.g., previously transmitted uplink data and scheduled uplink data) stored in the modem buffer exceeds the uplink buffer threshold, the UE 115 may transmit a feedback request message requesting that the base station 105 provide feedback for a previously transmitted uplink packet. The UE 115 may remove the previously transmitted uplink packet from the modem buffer in response to receiving a feedback message (e.g., ACK) indicating that the base station 105 successfully received the previously transmitted uplink packet. In some examples, the UE 115 may retransmit the previously transmitted uplink packet in response to receiving a feedback message (e.g., NACK) indicating that the base station 105 did not successfully receive the previously transmitted uplink packet.

The UE 115 may perform additional operations to manage the inflow of uplink data to the modem buffer when the uplink buffer threshold is exceeded. For example, the UE 115 may increase a feedback rate at which the UE 115 transmits feedback request messages to the base station 105 (e.g., fast polling) to prompt the base station 105 to respond with feedback messages. In an example, based on the increased quantity (number) of feedback request messages, the UE 115 may receive feedback messages at an increased rate. Accordingly, the UE 115 may remove successfully received uplink packets from the modem buffer at an increased rate.

In an example, the UE 115 may determine the amount of uplink data (e.g., previously transmitted uplink data and scheduled uplink data) stored in the modem buffer satisfies the uplink buffer threshold (e.g., exceeds the uplink buffer threshold). The UE 115 may transmit a disable command to an application host (also referred to herein as a host) of the UE 115 requesting that the application host stop forwarding uplink data to the modem buffer. In some examples, the UE 115 may determine the amount of uplink data (e.g., previously transmitted uplink data and scheduled uplink data) stored in the modem buffer is less than the uplink buffer threshold. The UE 115 may transmit an enable command to the application host requesting that the application host forward (e.g., reenable forwarding of) the uplink data to the modem buffer. In some examples, the UE 115 may readjust (e.g., decrease) the feedback rate when the amount of uplink data (e.g., previously transmitted uplink data and scheduled uplink data) is less than the uplink buffer threshold.

Figure 2:
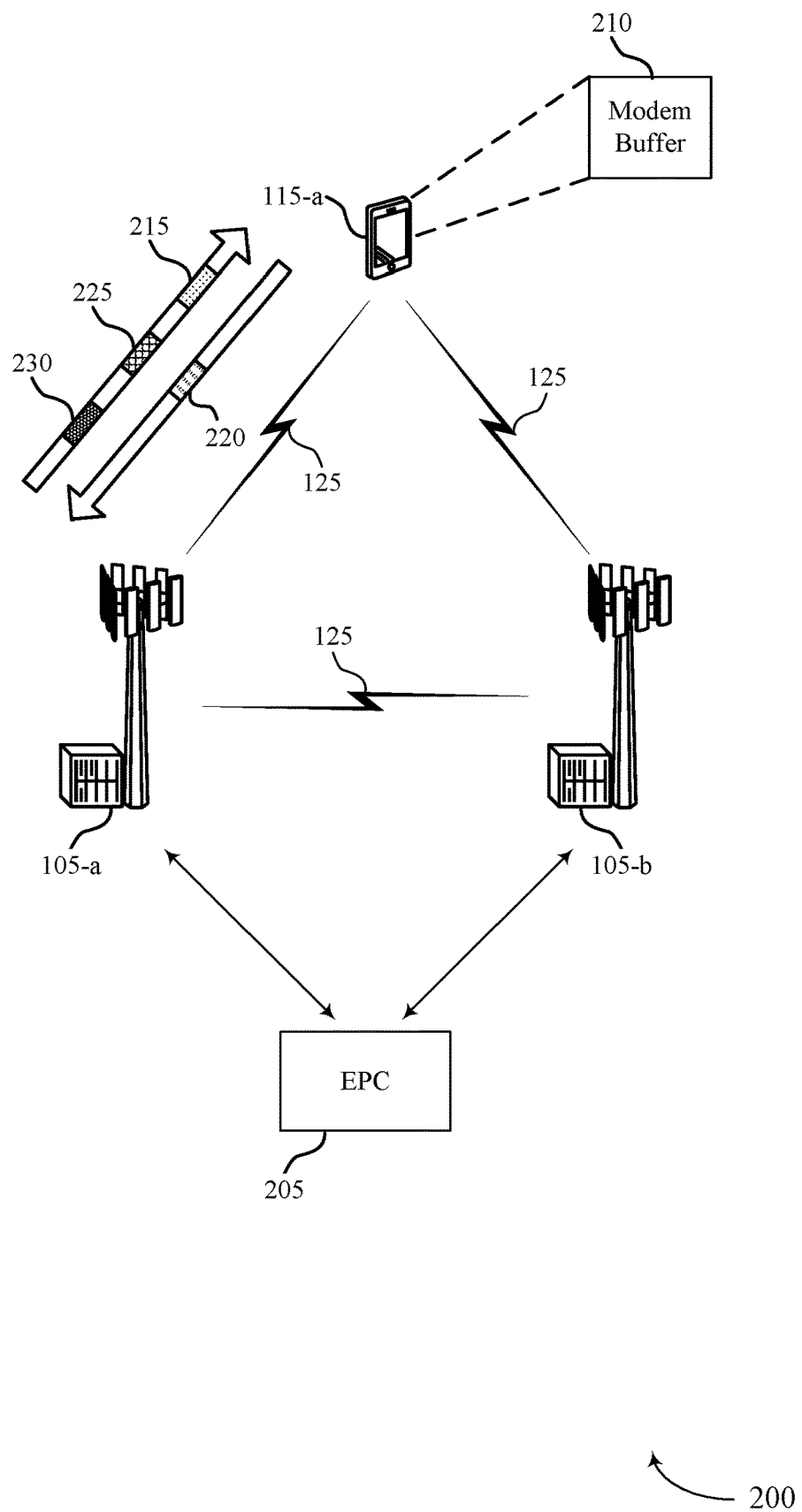
FIG. 2 illustrates an example of a wireless communications system that supports controlling modem memory used by uplink data in accordance with aspects of the present disclosure.

FIG. 2 illustrates an example of a wireless communications system 200 that supports controlling modem memory used by uplink data in accordance with aspects of the present disclosure. In some examples, wireless communications system 200 may implement aspects of wireless communication system 100. Wireless communications system 200 may include a UE 115-a, which may be an example of a UE 115 described with reference to FIG. 1.

The UE 115-a may include a modem buffer 210. The modem buffer 210 may be a region of physical memory storage used to temporarily store uplink data. For example, the buffer may include a region of a physical memory storage used to temporarily store the uplink data. The memory may include a cache memory, a random-access memory (RAM), a read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store uplink data.

Wireless communications system 200 may include a base station 105-a and a base station 105-b, which may be examples of a base station 105 described with reference to FIG. 1. The UE 115-a, the base station 105-a, and the base station 105-b may communicate via communication links 125 (as described with reference to FIG. 1). The wireless communications system 200 may support multiple radio access technologies including 4G systems such as LTE systems, LTE-A systems, or LTE-A Pro systems, and 5G systems, which may be referred to as NR systems.

In some aspects, the wireless communications system 200 may support single connectivity or dual connectivity. In an example, the wireless communications system 200 may support E-UTRAN New Radio-Dual Connectivity (EN-DC) (e.g., LTE-NR dual connectivity). In an example of dual connectivity, the UE 115-a may support simultaneous transmission and reception of data on multiple component carriers from a first cell group (e.g., an MCG) and a second cell group (e.g., an SCG). The two cell groups can be managed by different base stations (e.g., a NodeB, an eNB, a gNB).

The base station 105-a may be an eNB, while the base station 105-b may be a gNB. The base station 105-a may be configured to support 4G radio access technologies. For example, the base station 105-a may be an eNB capable of providing LTE/E-UTRA services to the UE 115-a. The base station 105-b may be configured to support 5G radio access technologies. For example, the base station 105-b may be a gNB capable of providing NR (e.g., 5G) user plane and control plane services to the UE 115-a. In some examples, both the base station 105-a and the base station 105-b may be configured to support the same radio access technologies. For example, in NR dual connectivity, the base station 105-a and the base station 105-b may be gNBs supporting 5G radio access technologies.

The wireless communications system 200 may include an EPC 205. The EPC 205 may be a 5GC. In an example, the EPC 205 may determine whether the UE 115-a is authorized for dual connectivity access. In some aspects, the EPC 205 may support switching of radio bearers between gNBs (e.g., the base station 105-b) and eNBs (e.g., the base station 105-a). The EPC 205 may include examples of aspects of the core network 130. In some examples, the wireless communications system 200 may be a packet-based wireless communications system that operates according to a layered protocol stack. The UE 115-a may be configured to support dual connectivity according to a protocol stack, in which the UE 115-a is connected to multiple cells, for example, two cell groups, a master cell group (MCG) associated with the base station 105-a and a secondary cell group (SCG) associated with the base station 105-b.

The wireless communications system 200 may support stand-alone (SA) operation and non-stand-alone (NSA) operation. In SA operation, a gNB (e.g., the base station 105-b) is connected to a 5G Core Network (5GC). NSA operation may integrate the eNB (e.g., the base station 105-a) and the gNB (e.g., base station 105-b) to provide dual connectivity for the UE 115-a. In an example, in 5G NSA mode, the network may establish a SCG bearer (e.g., NR packet data convergence protocol (PDCP)/NR radio link control (RLC)/NR MAC)) or a split bearer (e.g., NR PDCP/NR RLC/NR MAC+LTE RLC/LTE MAC). In another example, in 5G SA mode, the network may establish an SCG bearer (e.g., FR1 or FR2) or a split bearer (e.g., LTE+NR, FR1+FR2).

Figure 3:
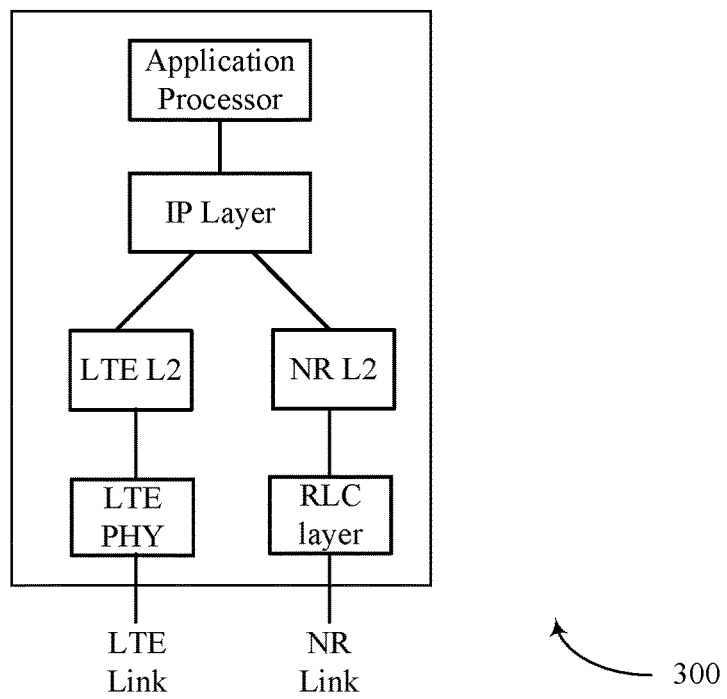
FIG. 3 illustrates examples of protocol stacks that support controlling modem memory used by uplink data in accordance with aspects of the present disclosure.
Figure 3:
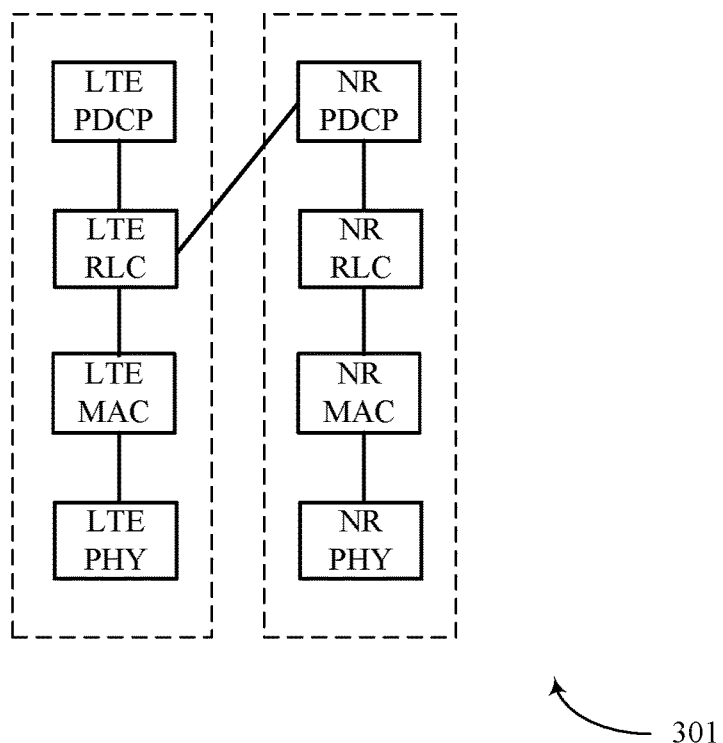

FIG. 3 illustrates a block diagram of a protocol stack 300 for a UE 115 (e.g., UE 115-a) that supports controlling modem memory used by uplink data in accordance with aspects of the present disclosure. FIG. 3 further illustrates a block diagram of a protocol stack 301 that supports controlling modem memory used by uplink data in accordance with aspects of the present disclosure.

The protocol stack 300 may include various protocol layers, for example, an IP layer, an LTE L2 layer, an LTE physical layer (PHY) layer, an NR L2 layer, and an NR PHY layer. A UE 115 (e.g., UE 115-a) may communicate using LTE technologies, for example, via an application processor, the IP layer, the LTE L2 layer, and the LTE PHY layer. Similarly, the UE 115 (e.g., UE 115-a) may communicate using NR technologies, for example, via the application processor, the IP layer, the NR L2 layer, and the NR PHY layer.

The protocol stack 301 may include various protocol layers, for example, an LTE PDCP layer, an LTE RLC layer, an LTE MAC layer, and an LTE PHY layer, an NR PDCP layer, an NR RLC layer, an NR MAC layer, and an NR PHY layer. Each of these layers (entities) may be in communication with one another (e.g., via one or more radio bearers, logical channels, transport channels, etc.). With reference to FIG. 2, the UE 115-a may be configured to support transfer of upper layer data units (e.g., PDUs) over one or multiple radio bearers. A radio bearer may be configured per cell group, for example, an MCG bearer and an SCG bearer. In some examples, a split bearer may be configured for both cell groups and handled by both cell groups, such as for both the MCG associated with a primary base station 105 (e.g., base station 105-a) and an SCG associated with a secondary base station 105 (e.g., base station 105-b).

The LTE PDCP layer and the LTE RLC layer may support transfer of upper layer data units (e.g., PDUs) over a first radio bearer (e.g., an MCG bearer). The NR PDCP layer and the NR RLC layer may support transfer of upper layer data units (e.g., PDUs) over a second radio bearer (e.g., an SCG bearer). The NR PDCP layer, the LTE RLC layer, and the NR RLC layer may support transfer of upper layer data units (e.g., PDUs) over a split bearer. For a split bearer, the UE 115-a may support transfer of upper layer data units (e.g., PDUs) on an uplink path, which may be preconfigured. For example, the UE 115-a may support transfer of upper layer data units on an uplink path of either an MCG associated with the base station 105-a or an SCG associated with the secondary base station 105-b.

The protocol stack 301 may be configured with separate RLC layers for a split bearer. As illustrated in FIG. 3, for example, the LTE RLC layer and the NR RLC layer may be configured for the split bearer. Both the LTE RLC layer and the NR RLC layer may share the same PDCP layer (e.g., NR PDCP layer). The NR PDCP layer may route upper layer data units (e.g., RLC PDUs) to the respective RLC layers, for example, the LTE RLC layer and the NR RLC layer, based on routing information. An uplink path may correspond to a transfer route via a collection of protocol layers to an MCG associated with the base station 105-a and an SCG associated with the base station 105-b.

In some systems, each RLC layer (e.g., LTE RLC layer, NR RLC layer) may retain a copy of every transmitted RLC PDU until acknowledged by the network (e.g., a base station). In some configurations the UE 115-a may need to retain all transmitted packets having a sequence number greater than or equal to a highest in-sequence ACK sequence number (e.g., a highest sequence number of an ACK included in the same sequence). In an example, the UE 115-a may transmit packets 1 through 10 according to a corresponding sequence order 1 through 10. The UE 115-a may receive an ACK for packets 1, 2, 5, 7, and 9. The UE 115-a may retain copies of packets 3 through 10, for example, in anticipation of a PDCP data recovery procedure. For example, the UE 115-a may retain a copy of every RLC PDU transmitted during a transmission window (also referred to herein as a TxWin or uplink TxWin). For example, the transmission window may be a buffer for retaining copies of transmitted packets.

With two RLC entities (e.g., one entity for LTE, one entity for NR) for the UE 115-a, higher data rates associated with NR, and a high potential for bursts of high block error rate (BLER) in the mmW frequency bands, the transmission windows for buffering or retaining copies of transmitted RLC PDUs may increase, which may lead to an increase in the amount of uplink data stored in the modem buffer 210 waiting to be acknowledged. In some aspects, conditions such as a noisy (e.g., noise above a threshold) wireless channel may reduce the number of successful transmissions between devices (e.g., the UE 115-a and the base station 105-a, the UE 115-a and the base station 105-b, the UE 115-a and another UE 115), further increasing the amount of uplink data stored in the modem buffer 210 and waiting to be acknowledged. Example aspects of techniques for management of such cases by the UE 115-a are described herein.

In an example, the uplink data stored in the modem buffer 210 may be based on the total memory consumed by uplink packets in the modem buffer 210. For example, the uplink data stored in the modem buffer 210 may store previously transmitted uplink data, such as already transmitted RLC data (e.g., L2 transmission window, across RLC entities, and across all radio bearers). In some other aspects, the UE 115-a may store (e.g., in the modem buffer 210) uplink data not yet transmitted by the UE 115-a. In an example, the uplink data not yet transmitted may include scheduled uplink data. In some examples, the amount of uplink data stored in the modem buffer 210 may exceed the storage size of the modem buffer 210. As the amount of uplink data (e.g., scheduled uplink data and previously transmitted uplink data) stored in the modem buffer 210 increases, the available memory in the modem buffer 210 for supporting downlink traffic decreases, which may negatively impact downlink throughput (e.g., hurt downlink throughput) at the UE 115-a.

According to examples of aspects described herein, as discussed with reference to FIG. 2, the UE 115-a may receive a control message 215 from a base station 105, for example, the base station 105-a. The control message 215 may indicate a resource configuration for uplink and downlink transmissions. The UE 115-a may determine an uplink buffer threshold for the modem buffer 210 of the UE 115-a based on the resource configuration. In some aspects, the resource configuration may indicate time and frequency resources allocated to the UE 115-*a* by the base station 105-*a* for uplink and downlink transmissions.

In an example, the UE 115-*a* may use the resource configuration to derive a configured throughput (e.g., peak rate possible with the given configuration), a priority, or a latency for the uplink transmissions. The resource configuration may, for example, specify a TTI structure (e.g., a subframe or slot structure) indicating a first defined number of uplink symbol periods, a second defined number of downlink symbol periods, a maximum number of MIMO layers, bandwidth, modulation and coding schemes, or any combination thereof, for uplink and downlink transmissions. In some examples, the resource configuration may specify quality of service (QoS) parameters for the uplink transmissions. In some examples, the resource configuration may indicate a configured throughput (e.g., peak rate possible), a priority, or a latency for the downlink transmissions. In some examples, the resource configuration may specify QoS parameters for the uplink transmissions, the downlink transmissions, or both.

The UE 115-*a* may determine the uplink buffer threshold based on the configured throughput (e.g., peak rate possible), the priority, or the latency for the uplink transmissions. In some aspects, the UE 115-*a* may determine the uplink buffer threshold based on the configured throughput (e.g., peak rate possible), the priority, or the latency for the downlink transmissions. In an example, the UE 115-*a* may determine the uplink buffer threshold based on the respective throughputs, priorities, or latencies for the uplink transmissions or the downlink transmissions, for example, in combination with the total memory (e.g., total memory size) of the modem buffer 210.

In an example, the UE 115-*a* may determine (e.g., identify) the presence of downlink traffic at the UE 115-*a*. For example, the UE 115-*a* may determine (e.g., identify) the presence of downlink traffic based on whether a previous downlink throughput value exceeds a downlink throughput threshold. In some aspects, the downlink throughput threshold may be a preconfigured downlink throughput threshold or a percentage of a configured downlink throughput threshold. In an example, the downlink throughput threshold may be equal to 10 percent of a configured downlink throughput.

The UE 115-*a* may determine (e.g., set) an uplink buffer threshold (also referred to herein as a memory usage threshold) for the modem buffer 210. The uplink buffer threshold may correspond to an amount of memory allocated by the UE 115-*a* for uplink operations (e.g., for storing scheduled uplink data and previously transmitted uplink data). In some aspects, the uplink buffer threshold may be referred to as a transmission memory threshold or a TxMemCap. In some aspects, the uplink buffer threshold may correspond to a size of transmission window (also referred to herein as a TxWin or uplink TxWin) for retaining copies of previously transmitted uplink packets or copies of uplink packets to be transmitted. For example, the uplink buffer threshold may correspond to an amount of allocated memory for retaining copies of previously transmitted uplink packets or copies of uplink packets to be transmitted. In some aspects, the uplink buffer threshold may correspond to the sum of the amounts described above. For example, the uplink buffer threshold may correspond to memory used by scheduled uplink data plus the transmission window.

In an example, the UE 115-*a* may determine (e.g., identify) the presence of downlink traffic at the UE 115-*a* based on the previous downlink throughput value exceeding the downlink throughput threshold. In some aspects, based on the determination, the UE 115-*a* may determine (e.g., set) the uplink buffer threshold in response to determining (e.g., identifying) the presence of downlink traffic. In another example, the UE 115-*a* may determine (e.g., identify) the absence of downlink traffic at the UE 115-*a* based on the previous downlink throughput value being less than the downlink throughput threshold. In some aspects, based on the determination, the UE 115-*a* may refrain from determining (e.g., setting) the uplink buffer threshold. That is, when there is an absence of downlink traffic at the UE 115-*a*, the UE 115-*a* may refrain from setting a maximum or threshold buffer size (or memory size) for retaining copies of transmitted uplink packets. In some aspects, the UE 115-*a* may increase the downlink throughput threshold as the downlink throughput decreases.

In some aspects, the UE 115-*a* may determine the uplink buffer threshold (e.g., transmission memory threshold, TxMemCap) based on a function of the total shared memory available (e.g., memory size, buffer size) of the modem buffer 210. In some cases, the total memory available may be based on properties of a chipset installed at the UE 115-*a*. In some cases, the total memory available to support downlink and uplink operations may be a fixed amount. In an example, the UE 115-*a* may determine the uplink buffer threshold (e.g., transmission memory threshold, TxMemCap) so as to allocate memory of the modem buffer 210 in proportion to the uplink and downlink (configured) throughputs. For example, the UE 115-*a* may determine the uplink buffer threshold (e.g., transmission memory threshold, TxMemCap) based on the following equation:

$$TxMemCap = \text{total memory} \times \frac{UL \text{ configured } tput}{(UL \text{ configured } tput + DL \text{ configured } tput)} \times margin$$

In the equation, UL configured tput is a configured uplink throughput, DL configured tput is a configured downlink throughput, and the margin is equal to 0.8. The margin may refer to a factor for reducing the uplink buffer threshold (e.g., transmission memory threshold, TxMemCap). For example, based on the margin, the UE 115-*a* may reduce the uplink buffer threshold due to practical issues with memory management, for example, where not all of the available memory may actually be used at a given time. For example, due to memory fragmentation, the available memory may be allocated in a large number of non-contiguous blocks (chunks) and be thereby unusable at a given time.

In some aspects, the configured uplink throughput may represent a peak uplink rate possible according to a current RRC configuration (e.g., based on resources allocated to the UE 115-*a* by a base station 105) for uplink transmissions. In some aspects, the configured downlink throughput may represent a peak downlink rate possible according to a current RRC configuration (e.g., based on resources allocated to the UE 115-*a* by a base station 105) for downlink transmissions. In some examples, the allocated resources may account for TDD uplink/downlink allocations, and may allocate memory in proportion to the configured uplink and downlink throughputs. The peak uplink rate possible may, for example, may be a physical layer possible peak uplink rate (e.g., bandwidth for a carrier, maximum MCS the UE 115-*a* can use for uplink communications, a maximum dimension for MIMO with respect to beamforming). The peak downlink rate possible may, for example, may be a physical layer possible peak downlink rate (e.g., bandwidth for a carrier, maximum MCS the UE 115-a can use for downlink communications, a maximum dimension for MIMO with respect to beamforming).

In some aspects, the UE 115-a may transmit a feedback request message 220 to the base station 105-a, requesting the base station 105-a provide feedback for a previously transmitted uplink packet. For example, when the amount of uplink data (e.g., previously transmitted uplink data and scheduled uplink data) stored in the modem buffer 210 exceeds the uplink buffer threshold, the UE 115-a may transmit a feedback request message 220 requesting that the base station 105-a provide feedback for a previously transmitted uplink packet. In an example, the feedback request message 220 may include a packet identifier of the previously transmitted uplink packet.

The UE 115-a may remove the previously transmitted uplink packet from the modem buffer 210 in response to receiving a positive feedback message (e.g., ACK 225) indicating that the base station 105-a successfully received the previously transmitted uplink packet. In some examples, the UE 115-a may retransmit the previously transmitted uplink packet in response to receiving a negative feedback message (e.g., NACK 230) indicating that the base station 105-a did not successfully receive the previously transmitted uplink packet.

In some aspects, the UE 115-a may retransmit the previously transmitted uplink packet (e.g., via one or more radio bearers), prior to receiving a feedback response message corresponding to the feedback request message. In some examples, the UE 115-a may transmit uplink packets (or retransmit previously transmitted uplink packets) during a transmission window. In an example, the UE 115-a may store (e.g., in the modem buffer 210) a copy of each packet transmitted during the transmission window. In some examples, in retransmitting previously transmitted uplink packets for which an ACK has not yet been received, the UE 115-a may prioritize the retransmissions according to an order starting from the packet having the lowest sequence number.

The UE 115-a may perform additional operations to manage the inflow of uplink data to the modem buffer 210 when the uplink buffer threshold is exceeded. For example, the UE 115-a may support RLC polling. In an example of RLC polling, the UE 115-a may transmit one or more feedback request messages (e.g., feedback request message 220) to the base station 105-a to prompt the base station 105-a to respond with a status report for previously transmitted uplink packets. In an example, the UE 115-a may transmit feedback request messages (e.g., feedback request message 220) to the base station 105-a to prompt the base station 105-a to respond with feedback messages (e.g., ACK 225, NACK 230). Based on the feedback messages, the UE 115-a may remove successfully received uplink packets from the modem buffer 210 or retain unsuccessfully received uplink packets in the modem buffer 210. Additionally, or alternatively, when PDCP recovery is supported, the UE 115-a may remove packets for which an ACK was previously received and which have relatively lower sequence numbers.

In an example, based on a status report, the UE 115-a may identify uplink packets which where unsuccessfully received by the base station 105-a (e.g., indicated by NACK 230). The UE 115-a may retransmit the unsuccessfully received uplink packets to the base station 105-a. In another example, based on a status report, the UE 115-a may identify uplink packets which were successfully received by the base station 105-a (e.g., indicated by ACK 225). The UE 115-a may remove the successfully received uplink packets from the modem buffer 210 (e.g., from a memory of the modem buffer 210).

In some aspects, the UE 115-a may enable an uplink memory flow control state of the UE 115-a when the uplink buffer threshold is exceeded. In an example, when in the uplink memory flow control state, the UE 115-a may enable fast RLC polling where the UE 115-a may increase a feedback rate at which the UE 115-a transmits feedback request messages (e.g., feedback request message 220) to the base station 105-a for soliciting or prompting the base station 105-a to respond with feedback response messages. For example, the UE 115-a may increase the feedback rate compared to a previous feedback request rate configured by over-the-air RRC signaling (e.g., an initial feedback request rate corresponding to an RRC configuration received over-the-air at the UE 115-a). In some examples, the UE 115-a may control the feedback rate for RLC polling by parameters pollPDU and pollBytes, for example, by setting a poll bit (e.g., a poll bit value) which may prompt UE 115-a to transmit a feedback request message to cause the base station 105-a to transmit a status report in reply. In an example, based on the increased frequency at which feedback request messages are sent, the UE 115-a may receive feedback response messages (e.g., ACK 225, NACK 230) at an increased rate. Accordingly, the UE 115-a may remove successfully received uplink packets from the modem buffer 210 at an increased rate.

In an example, when the uplink buffer threshold is exceeded, the UE 115-a may poll the base station 105-a at an increased polling rate (e.g., to prompt the base station 105-a to send status reports more frequently), attempting to reduce the amount of uplink data stored in the modem buffer 210. For example, based on the increased feedback rate, the UE 115-a may transmit feedback request messages (e.g., feedback request message 220) at a rate of one feedback request message 220 per OFDM slot. In another example, based on the increased feedback rate, the UE 115-a may transmit feedback request messages (e.g., feedback request message 220) at a rate of one feedback request message 220 per every 2 ms. In some aspects, the UE 115-a may transmit feedback request messages (e.g., feedback request message 220) according to a fraction of the thresholds configured by RRC signaling. For example, the UE 115-a may transmit feedback request messages (e.g., feedback request message 220) at a rate different from (e.g., higher than) an initial feedback request rate configured by RRC signaling via the pollPDU and pollBytes threshold configurations. In some examples, the UE 115-a may receive the RRC signaling from a base station 105 (e.g., base station 105-a, base station 105-b) configuring the polling parameters.

In an example, the UE 115-a may determine the amount of uplink data (e.g., previously transmitted uplink data and scheduled uplink data) stored in the modem buffer 210 exceeds the uplink buffer threshold. The UE 115-a may transmit a disable command to an application host (also referred to herein as a host) of the UE 115-a requesting that the application host stop forwarding uplink data to the modem buffer 210. The UE may also internally stop the flow of data between the application host and the modem buffer 210 by stopping or pausing memory read/write operations at the modem buffer 210. In some aspects, by preventing additional uplink data from being forwarded to the modem buffer 210, the UE 115-a may mitigate additional uplink data (e.g., previously transmitted uplink data and scheduled uplink data) stored to the modem buffer 210. For example, the amount of uplink data stored in the modem buffer 210 may decrease (e.g., the amount of memory used for uplink data may decrease).

In some examples, the UE 115-a may determine the amount of uplink data (e.g., previously transmitted uplink data and scheduled uplink data) stored in the modem buffer 210 is less than the uplink buffer threshold. The UE 115-a may transmit an enable command to the application host requesting that the application host forward (e.g., reenable forwarding of) the uplink data to the modem buffer 210. In some examples, the UE 115-a may readjust (e.g., decrease) the feedback rate when the amount of uplink data (e.g., previously transmitted uplink data and scheduled uplink data) is less than the uplink buffer threshold. In some aspects, the UE 115 may disable autonomous retransmissions to mitigate clearing of the modem buffer 405.

In an example, the UE 115-a may enter (e.g., enable) the uplink memory flow control state based on comparing a sum of previously transmitted uplink data stored in the modem buffer 210, such as already transmitted RLC data (e.g., L2 transmission window, across RLC entities, and across all radio bearers or data radio bearers (DRBs)) and scheduled uplink data stored in the modem buffer 210 (e.g., uplink data not yet transmitted by the UE 115-a) to an uplink buffer threshold (also referred to herein as txwin_cap, L2). That is, the UE 115-a may enter (e.g., enable) the uplink memory flow control state when the uplink modem buffer+L2 Tx window (e.g., summed across all DRBs) <txwin_cap*threshold. The threshold may be equal to 1. In some aspects, txwin_cap may also be referred to herein as a transmission window, a transmission window maximum, UL MEMORY CAP, or the maximum amount of memory that the UE 115-a allocates for consumption by uplink operations. The uplink buffer threshold may be calculated as discussed herein.

In an example, the UE 115-a may enter (e.g., enable) the uplink memory flow control state when the sum of previously transmitted uplink data stored in the modem buffer 210 and the scheduled uplink data stored in the modem buffer 210 exceeds the uplink buffer threshold. In an example, when in the uplink memory flow control state, the UE 115-a may transmit a disable command to the application host (also referred to herein as the host). In some aspects, based on the disable command, the application host may disable a data flow of uplink data to the modem buffer 210 (e.g., disable modem data flow), thereby preventing additional uplink data from being forwarded by the application host to the modem buffer 210 for storage. Disabling modem data flow may, for example, may support that the amount of memory used for uplink data may decrease. When in the uplink memory flow control state, the UE 115-a may also, in some examples, enable fast RLC polling as described herein.

In another example, the UE 115-a may exit (e.g., disable) the uplink memory flow control state based on comparing the sum of previously transmitted uplink data stored in the modem buffer 210 to the uplink buffer threshold. For example, the UE 115-a may exit (e.g., disable) the uplink memory flow control state when the sum of previously transmitted uplink data stored in the modem buffer 210 and the scheduled uplink data stored in the modem buffer 210 is less than the uplink buffer threshold. In an example of exiting (e.g., disabling) uplink memory flow control state, the UE 115-a may transmit an enable command to the application host (also referred to herein as the host). In some aspects, based on the enable command, the application host may enable data flow of uplink to the modem buffer 210 (e.g., enable modem data flow), thereby allowing additional uplink data to be forwarded to the modem buffer 210 by the application host. When exiting (e.g., disabling) the uplink memory flow control state, for example, the UE 115-a may, in some examples, disable fast RLC polling as described herein.

In some examples, the UE 115-a may remove or refrain from determining (e.g., setting) the uplink buffer threshold such that memory previously reserved for downlink data may be allocated to uplink data. For example, the UE 115-a may remove or refrain from determining (e.g., setting) the uplink buffer threshold when the UE 115-a determines (e.g., identifies) an absence of downlink traffic at the UE 115-a. The UE 115-a may determine the absence of downlink traffic based on a previous downlink throughput value being less than a downlink throughput threshold, as previously described herein. In some aspects, the UE 115-a may exit (e.g., disable) the uplink memory flow control state when the UE 115-a removes or refrains from determining (e.g., setting) the uplink buffer threshold. The UE 115-a may be able to achieve a higher uplink throughput when memory usage for uplink operations is not capped. But when there is downlink data (e.g., downlink traffic), capping the memory usage for uplink operations may provide some balance or fairness between uplink and downlink operations. In some cases, in refraining from determining (e.g., setting) the uplink buffer threshold, the UE 115-a may indicate that the L2 transmission window is not being limited or set (e.g., L2 indicates "not limiting TX Win"). In some aspects, the UE 115-a may transmit data for enabling the application host (e.g., memory flow control state, modem data flow) when the L2 transmission window is not being limited or set (e.g., when L2 indicates "not limiting TX Win"). In some aspects, the L2 layer may disable or pause fast RLC polling.

Figure 4:
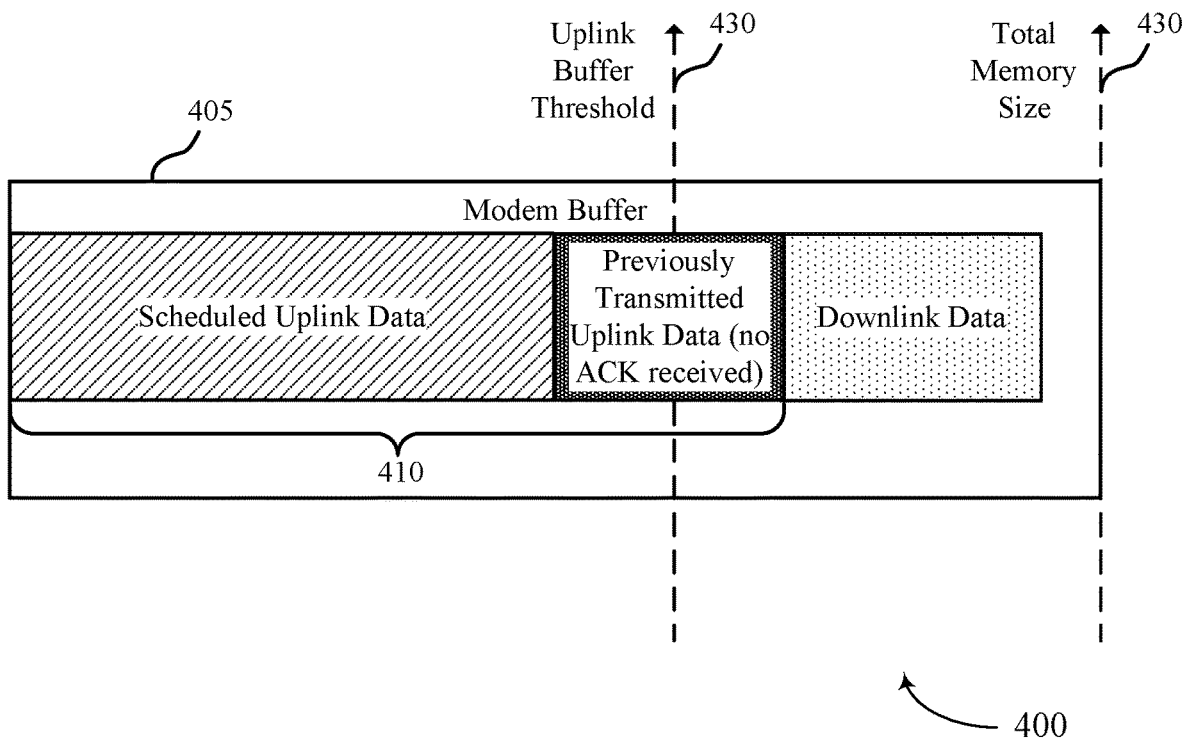
FIG. 4 illustrates examples of a modem buffer storing an amount of previously transmitted uplink data and scheduled uplink data relative to an uplink buffer threshold that supports controlling modem memory used by uplink data in accordance with aspects of the present disclosure.
Figure 4:
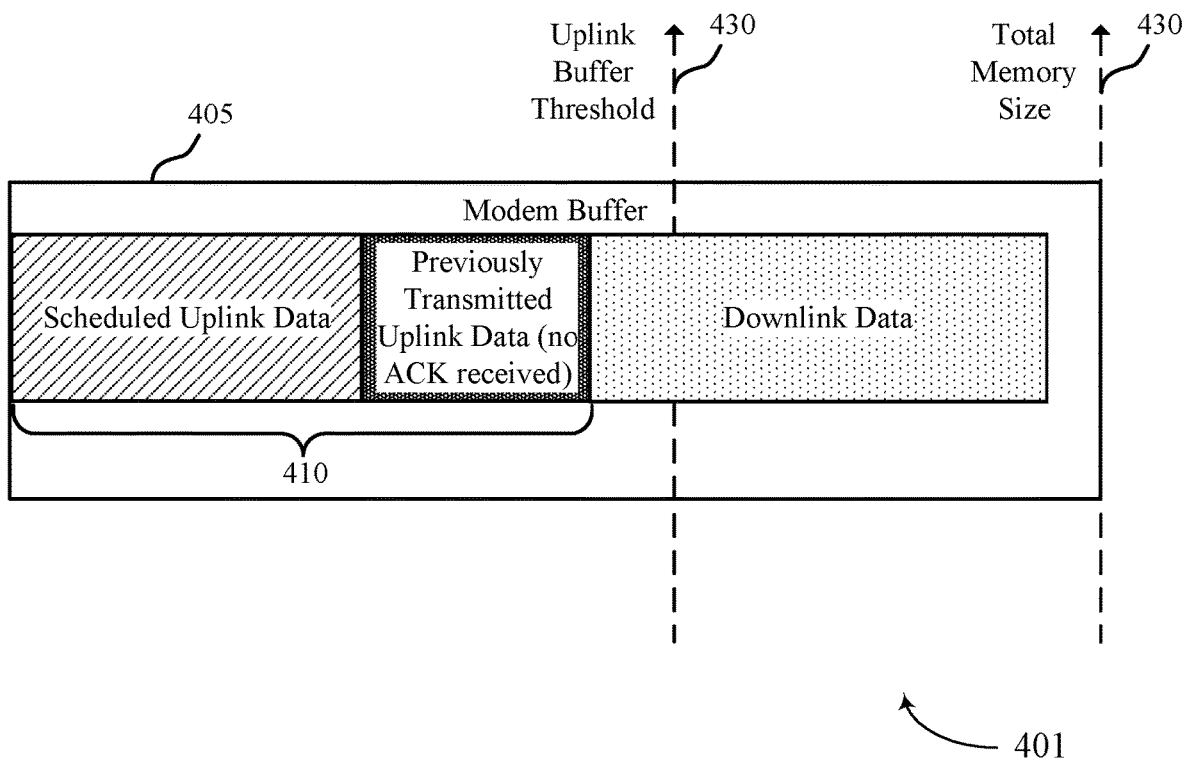

FIG. 4 illustrates examples 400 and 401 of a modem buffer storing an amount of previously transmitted uplink data and scheduled uplink data stored relative to an uplink buffer threshold 430. Examples 400 and 401 support controlling modem memory used by uplink data in accordance with aspects of the present disclosure. Examples 400 and 401 may be implemented by aspects of wireless communication system 100, wireless communications system 200, protocol stack 300, and protocol stack 301 described with reference to FIGS. 1 through 3. For example, examples 400 and 401 may be implemented by a UE 115 or a UE 115-a described with reference to FIGS. 1 and 2. Examples 400 and 401 include a modem buffer 405, which may be an example of the modem buffer 210 described with reference to FIG. 2.

A UE 115 may determine the uplink buffer threshold 430 (also referred to herein as a usage threshold or a memory usage threshold) for the modem buffer 405 based on a resource configuration received from a base station 105, as described herein. The uplink buffer threshold 430 may correspond to an amount of memory allocated by the UE 115 for uplink operations (e.g., for storing scheduled uplink data and previously transmitted uplink data).

Referring to example 400, uplink data 410 (e.g., including previously transmitted uplink data and scheduled uplink data) stored in the modem buffer 405 exceeds the uplink buffer threshold 130. In some aspects, if the UE 115 determines the uplink data 410 (e.g., including previously transmitted uplink data and scheduled uplink data) stored in the modem buffer 405 exceeds the uplink buffer threshold 430, the UE 115 may transmit a feedback request message requesting that the base station 105 provide feedback for at least one previously transmitted uplink packet that is stored in the modem buffer 405. In an example, the UE 115 may remove a previously transmitted uplink packet from the modem buffer 405 (e.g., thereby reducing the amount of previously transmitted uplink data) in response to receiving a corresponding positive feedback message (e.g., ACK) indicating that the base station 105 successfully received the previously transmitted uplink packet.

In some aspects, if the UE 115 determines the uplink data 410 (e.g., including previously transmitted uplink data and scheduled uplink data) stored in the modem buffer 405 exceeds the uplink buffer threshold 430, the UE 115 may enable an uplink memory flow control state of the UE 115. For example, according to the uplink memory flow control state, the UE 115 may adjust (e.g., increase) a feedback rate at which the UE 115 transmits feedback request messages to the base station 105 (e.g., RLC fast polling) for prompting the base station 105 to respond with feedback messages. In some examples, the UE 115 may transmit a disable command to an application host (also referred to herein as a host) of the UE 115 requesting that the application host stop forwarding uplink data (scheduled uplink data) to the modem buffer 405.

Referring to example 401, the uplink data 410 (e.g., including previously transmitted uplink data and scheduled uplink data) stored in the modem buffer 405 is less than the uplink buffer threshold 430. In some aspects, if the UE 115 determines the uplink data 410 (e.g., including previously transmitted uplink data and scheduled uplink data) stored in the modem buffer 405 is less than the uplink buffer threshold 430, the UE 115 may disable an uplink memory flow control state of the UE 115. For example, the UE 115 may adjust (e.g., decrease) a feedback rate at which the UE 115 transmits feedback request messages to the base station 105 (e.g., disable RLC fast polling). In some examples, the UE 115 may transmit an enable command to an application host (also referred to herein as a host) of the UE 115 requesting that the application host resume forwarding uplink data (scheduled uplink data) to the modem buffer 405.

In some aspects, the UE 115 may support autonomous retransmissions (e.g., autonomous RLC transmissions) of uplink packets for which the UE 115 received a negative feedback message (e.g., NACK). For example, the UE 115 may retain unsuccessfully received uplink packets in the modem buffer 405 (e.g., thereby increasing the amount of previously transmitted uplink data). The UE 115 may autonomously retransmit the uplink packets for which a negative feedback message (e.g., NACK) was received, beginning from an edge of the memory of the modem buffer 405 (e.g., the left edge of the previously transmitted uplink data included the uplink data 410). In some aspects, the UE 115 may enable autonomous retransmissions if the UE 115 determines the uplink data 410 (e.g., including previously transmitted uplink data and scheduled uplink data) stored in the modem buffer 405 exceeds the uplink buffer threshold 430 (e.g., as part of enabling an uplink memory flow control state of the UE 115).

In an example, the UE 115 may store uplink packets in the uplink data 410 in order of previous transmission. For example, uplink packets at the left edge of the previously transmitted uplink data may be the least recently (e.g., relatively oldest) transmitted uplink data packets, and uplink packets at the right edge of the previously transmitted uplink data may be the most recently (e.g., relatively newest) transmitted uplink data packets. For example, the UE 115 may store scheduled uplink packets in the uplink data 410 according to scheduling order. In an example, uplink packets at the left edge of the scheduled uplink data may be the least recently (e.g., relatively oldest) scheduled uplink data packets, and uplink packets at the right edge of the scheduled uplink data may be the most recently (e.g., relatively newest) scheduled uplink data packets.

In some aspects, the autonomous retransmissions may improve recovery time, compared to waiting for a subsequent status report (e.g., a subsequent feedback message) from a base station 105 (e.g., base station 105-a, base station 105-b). In some examples, the UE 115 may enable autonomous retransmissions to support aggressive clearing (e.g., reducing memory usage) of the modem buffer 405. In some aspects, the UE 115-b may compress the memory of the modem buffer 405. For example, the UE 115-b may compress the scheduled uplink data, the previously transmitted uplink data, or the downlink data stored in the modem buffer 405.

Figure 5:
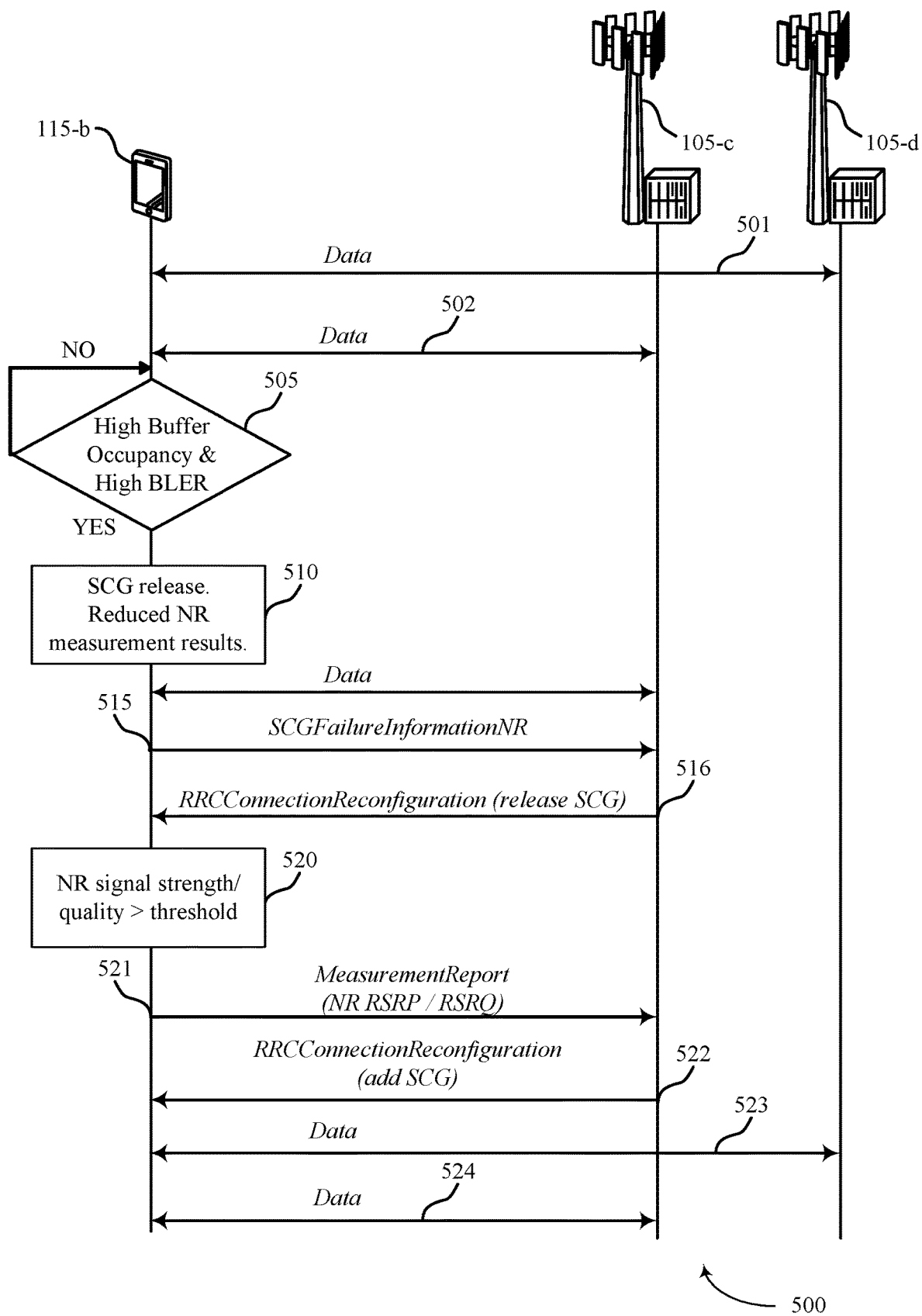
FIG. 5 illustrates an example of a process flow that supports controlling modem memory used by uplink data in accordance with aspects of the present disclosure.

FIG. 5 illustrates an example of a process flow 500 that supports controlling modem memory used by uplink data in accordance with aspects of the present disclosure. In some examples, the process flow 500 may implement aspects of wireless communication system 100, wireless communications system 200, protocol stack 300, protocol stack 301, and modem buffer 405 described with reference to FIGS. 1 through 4. The process flow 500 may include a UE 115-b, which may be an example of a UE 115 or a UE 115-a described with reference to FIGS. 1 and 2. The process flow 500 may include a base station 105-c and a base station 105-d, which may be examples of a base station 105, a base station 105-a, or a base station 105-b described with reference to FIGS. 1 and 2.

The base station 105-c may be an eNB, while the base station 105-d may be a gNB. The base station 105-c may be configured to support 4G radio access technologies. For example, the base station 105-c may support an LTE network. The base station 105-d may be configured to support 5G radio access technologies. For example, the base station 105-d may support an NR network. In some examples, both the base station 105-c and the base station 105-d may be configured to support the same radio access technologies. For example, in NR dual connectivity, the base station 105-d and the base station 105-d may be gNBs supporting 5G radio access technologies.

In the following description of the process flow 500, the operations between UE 115-c and base station 105-c may be transmitted in a different order than the order shown, or the operations performed by base station 105-c and UE 115-c may be performed in different orders or at different times. Some operations may also be left out of the process flow 500, or other operations may be added to the process flow 500. It is to be understood that while UE 115-b, base station 105-c, and base station 105-d are shown performing a number of the operations of process flow 500, any wireless device may perform the operations shown.

FIG. 5 illustrates an example of SCG failure in a dual connectivity scenario. For example, the UE 115-b, the base station 105-c, and the base station 105-b may support dual connectivity in which the UE 115-b may establish an MCG for exchanging data (e.g., with the base station 105-c) via an LTE link and an SCG for exchanging data (e.g., with the base station 105-d) via an NR link. In an example, at 501, the UE 115-b may exchange data with the base station 105-d via the NR link. At 502, the UE 115-b may exchange data with the base station 105-c via the LTE link.

At 505, the UE 115-b may determine an amount of previously transmitted uplink data and scheduled uplink data (corresponding to data previously transmitted and data to be transmitted from the UE 115-b to the base station 105-c and base station 105-d) stored in a modem buffer of the UE 115-b. In an example, at 505, the UE 115-b may determine whether the amount of previously transmitted uplink data and scheduled uplink data exceeds an uplink buffer threshold. In an example, at 505, when the quantity (number) of uplink packets stored in a L2 buffer of the UE 115-b is above a threshold (e.g., high L2 buffer occupancy), a block error rate (BLER) associated with the packets is above a BLER threshold (e.g., high BLER), or both, the UE 115-b may trigger a cell group failure (e.g., SCG failure). In some aspects, the UE 115-b may determine uplink BLER from feedback messages (e.g., ACK, NACK) received in downlink transmissions (e.g., from the base station 105-d at 501 or the base station 105-c at 502). In some aspects, the UE 115-b may determine downlink BLER based on transport decoding results (e.g., results associated with decoding attempts for downlink transmissions).

In some examples, at 510, based on the buffer occupancy exceeding the threshold, the BLER exceeding the threshold, or both, the UE 115-b may determine to release the SCG. In an example, at 515, the UE 115-b may transmit a release command (e.g., SCGFailureInformationNR) to the base station 105-c for releasing the SCG. At 516, the UE 115-b may receive RRC signaling (e.g., RRCConnectionReconfiguration) from the base station 105-c indicating a configuration for releasing the SCG. In an example, the UE 115-b may remove the RLC entity for the SCG (e.g., corresponding to the NR link with base station 105-d), and the UE 115-a may retransmit packets over the MCG (e.g., via the LTE link with base station 105-c). For example, after releasing the SCG (e.g., corresponding to the NR link with base station 105-d), the UE 115-b may transmit packets (e.g., data) buffered in the memory buffer or receive packets (e.g., data) over the MCG (e.g., corresponding to the LTE link with base station 105-c). In an example, the UE 115-b may transmit (retransmit), via the MCG, an uplink packet (e.g., data) that the UE 115-b previously transmitted via the SCG.

In some other examples, at 510, the UE 115-b may measure NR signals (e.g., signal quality, signal values) received from the base station 105-d. For example, the UE 115-b may measure signals received from the base station 105-d over the established SCG (e.g., signals received via the NR link). In some aspects, the UE 115-b may mitigate the amount of data buffered in the uplink buffer of the UE 115-b. For example, at 510, the UE 115-b may determine to transmit reduced NR measurement reports, which may prevent the LTE network (e.g., UE 115-c) from adding back the SCG. In some examples, at 510, the UE 115-b may determine to provide degraded or reduced NR measurement results. The UE 115-b may later provide measurement reports for the measured NR signals to the base station 105-c. In an example, the UE 115-b may later transmit degraded or reduced NR measurement results (e.g., r'=r−offset, where r represents raw measurement results (e.g., true quality) and offset is a reduced amount) in a NR measurement report to the UE 115-c.

In some aspects, at 520, the UE 115-b may determine whether NR signal strength or signal quality is exceeds a threshold. In an example, when the UE 115-b determines that NR signal strength or signal quality is exceeds a threshold, the UE 115-b may resume transmissions of non-degraded NR measurement reports. For example, at 521, the UE 115-b may resume transmission of non-degraded NR measurement reports (e.g., NR RSRP values, RSRQ values) to the base station 105-c. In an example, based on the non-degraded NR measurement reports, at 522, the base station 105-c may transmit RRC signaling (e.g., RRCConnectionReconfiguration) indicating a configuration for reestablishing or adding the SCG for exchanging data (e.g., with the base station 105-d) via an NR link. In an example, at 523, the UE 115-b may exchange data with the base station 105-d via the NR link. At 524, the UE 115-b may exchange data with the base station 105-c via the LTE link.

Figure 6:
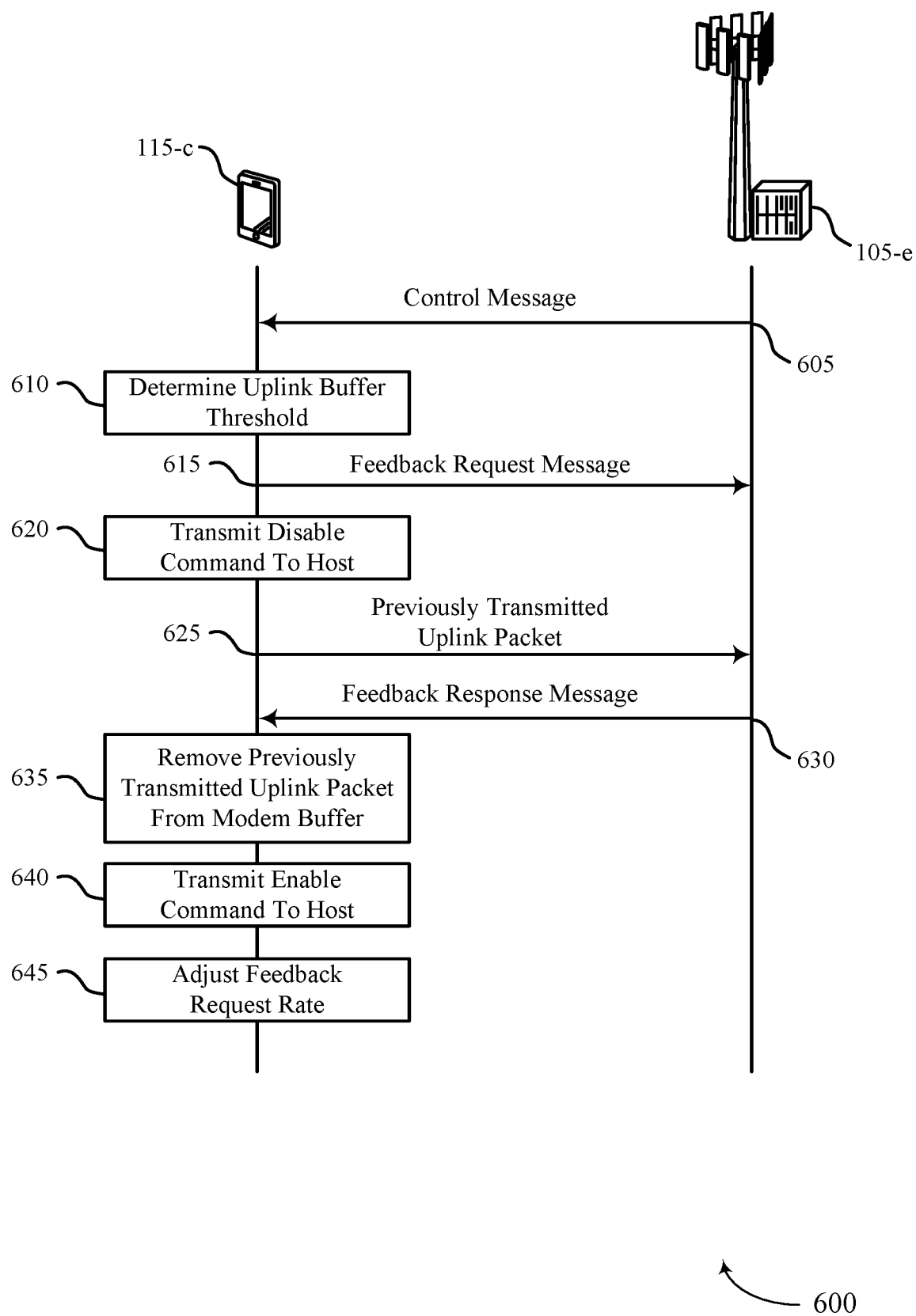
FIG. 6 illustrates an example of a process flow that supports controlling modem memory used by uplink data in accordance with aspects of the present disclosure.

FIG. 6 illustrates an example of a process flow 600 that supports controlling modem memory used by uplink data in accordance with aspects of the present disclosure. In some examples, the process flow 600 may implement aspects of wireless communication system 100, wireless communications system 200, protocol stack 300, protocol stack 301, uplink memory buffer 400, uplink memory buffer 401, and process flow 500 described with reference to FIGS. 1 through 5.

The process flow 600 may include a UE 115-c, which may be an example of a UE 115, a UE 115-a, or a UE 115-b described with reference to FIGS. 1, 2, and 5. The process flow 500 may include a base station 105-e, which may be an example of a base station 105, a base station 105-a, a base station 105-b, a base station 105-c, or a base station 105-d described with reference to FIGS. 1, 2, and 5.

The base station 105-e may be an eNB or a gNB. The base station 105-e may be configured to support 4G radio access technologies. For example, the base station 105-e may support an LTE network. Alternatively, the base station 105-e may be configured to support 5G radio access technologies. For example, the base station 105-e may support an NR network. In some examples, the base station 105-e may be configured to support the same radio access technology as another base station.

In the following description of the process flow 600, the operations between UE 115-c and base station 105-e may be transmitted in a different order than the order shown, or the operations performed by base station 105-c and UE 115-c may be performed in different orders or at different times. Some operations may also be left out of the process flow 600, or other operations may be added to the process flow 600. It is to be understood that while UE 115-c and base station 105-e are shown performing a number of the operations of process flow 600, any wireless device may perform the operations shown.

At 605, the UE 115-c may receive, from the base station 105-e, a control message indicating a resource configuration for uplink and downlink transmissions.

At 610, the UE 115-c may determine an uplink buffer threshold for a modem buffer of the UE 115-c based on the resource configuration. In some aspects, the UE 115-c may determine the uplink buffer threshold based on a throughput, a priority, or a latency, or any combination thereof, associated with uplink transmissions, downlink transmissions, or both. In an example, at least one of the throughput, the priority, or the latency is indicated in the resource configuration or via a host of the UE 115-c. In some other aspects, the UE 115-c may determine the uplink buffer threshold based on an uplink application data throughput, a downlink application data throughput, or both, for an application of the UE 115-c.

At 615, the UE 115-c may transmit, to the base station 105-e, a feedback request message requesting that the base station 105-e provide feedback for at least one previously transmitted uplink packet based on a comparison of an amount of previously transmitted uplink data and scheduled uplink data stored in the modem buffer relative to the uplink buffer threshold. In some aspects, the UE 115-c may enable an uplink memory flow control state of the UE 115-c when the amount of previously transmitted uplink data and scheduled uplink data stored in the modem buffer exceeds the uplink buffer threshold. In an example, when in the uplink memory flow control state, the UE 115-c may enable fast RLC polling where the UE 115-c may increase a feedback rate at which the UE 115-c transmits feedback request messages to the base station 105-e for prompting the base station 105-e to respond with feedback response messages. In an example, when the uplink buffer threshold is exceeded, the UE 115-c may poll the base station 105-e more frequently (e.g., to prompt the base station 105-e to send status reports more frequently), attempting to reduce the amount of uplink data stored in the modem buffer. In some aspects, transmitting the feedback request message further includes: transmitting the feedback request message including a packet identifier of a first previously transmitted uplink packet of the at least one previously transmitted uplink packet.

In an example, at 615, the UE 115-c may transmit the feedback request message in accordance with a feedback request rate that is adjusted based on the amount of previously transmitted uplink data and scheduled uplink data satisfying the uplink buffer threshold. In an example, when the amount of previously transmitted uplink data and scheduled uplink data stored in the modem buffer exceeds the uplink buffer threshold, the UE 115-c may transmit feedback request messages to the base station 105-e at an increased rate (e.g., to prompt the base station 105-e to send status reports more frequently), attempting to reduce the amount of uplink data stored in the modem buffer. In an example, the adjusted feedback request rate may be different from an initial feedback request rate configured by RRC signaling.

At 620, the UE 115-c may transmit a disable command to a host of the UE 115-c requesting that the host stop forwarding uplink data to the modem buffer based on an amount of uplink data stored in the modem buffer satisfying the uplink buffer threshold (e.g., based on the UE 115-c determining the amount of uplink data stored in the memory exceeds the uplink buffer threshold). The amount of uplink data may be a sum of the amount of previously transmitted uplink data stored in the modem buffer and the amount of scheduled uplink data stored in the modem buffer. The UE 115-c may determine (e.g., set) the uplink buffer threshold. In an example, the uplink buffer threshold may correspond to an amount of memory allocated by the UE 115-c for uplink operations (e.g., for storing previously transmitted uplink data and scheduled uplink data. For example, the amount of uplink data may be based on an amount of previously transmitted uplink data stored in the modem buffer (e.g., transmitted or retransmitted uplink data for which the UE 115-c has not received an ACK or for which the UE 115-c has received a NACK). In some examples, the amount of uplink data may be based on an amount of scheduled uplink data stored in the modem buffer (e.g., uplink data to be transmitted, for example, that is forwarded to the modem buffer from the host).

At 625, the UE 115-c may retransmit the at least one previously transmitted uplink packet. In an example, the UE 115-c may retransmit the at least one previously transmitted uplink packet, prior to receiving a feedback response message corresponding to the feedback request message. In some examples, a copy of the at least one previously transmitted uplink packet is stored in the modem buffer.

At 630, the UE 115-c may receive, based on transmitting the feedback request message, a feedback response message corresponding to a first previously transmitted uplink packet of the at least one previously transmitted uplink packet. In an example, at 630, the UE 115-c may receive a feedback response message corresponding to the at least one previously transmitted uplink packet.

At 635, the UE 115-c may remove the at least one previously transmitted uplink packet from the modem buffer based on the feedback response message. In an example, the feedback response message may be an ACK indicating that the base station 105-e successfully received or successfully decoded a previously transmitted uplink packet. In an example, the UE 115-c may remove the previously transmitted uplink packet from the modem buffer in response to the ACK, thereby reducing the amount of previously transmitted uplink data stored in the modem buffer.

At 640, the UE 115-c may transmit an enable command to a host of the UE 115-c requesting that the host forward uplink data to the modem buffer for transmission based on an amount of uplink data stored in the modem buffer failing to satisfy the uplink buffer threshold (e.g., based on the UE 115-c determining the amount of uplink data stored in the memory is less than the uplink buffer threshold). In an example, the amount of uplink data may be based on an amount of previously transmitted uplink data stored in the modem buffer (e.g., transmitted or retransmitted uplink data for which the UE 115-c has not received an ACK or for which the UE 115-c has received a NACK). In some examples, the amount of uplink data may be based on an amount of scheduled uplink data stored in the modem buffer (e.g., uplink data to be transmitted, forwarded to the modem buffer from the host).

At 645, the UE 115-c may adjust a feedback request rate based on the amount of previously transmitted uplink data and scheduled uplink data failing to satisfy the uplink buffer threshold. For example, the UE 115-c may adjust (e.g., decrease) a feedback rate at which the UE 115-c transmits feedback request messages to the base station 105-e (e.g., disable RLC fast polling).

Figure 7:
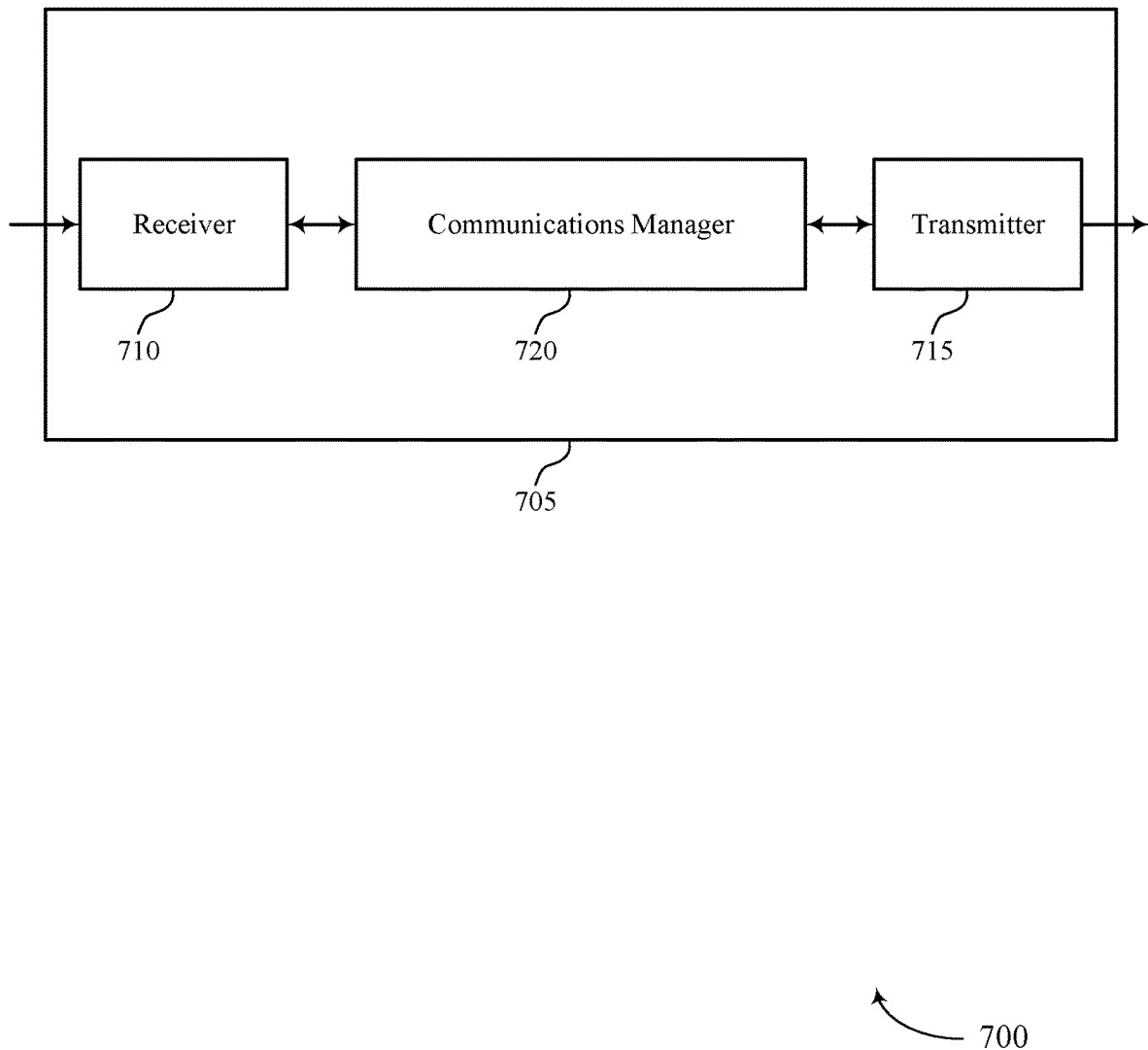
FIGS. 7 and 8 show block diagrams of devices that support controlling modem memory used by uplink data in accordance with aspects of the present disclosure.

FIG. 7 shows a block diagram 700 of a device 705 that supports controlling modem memory used by uplink data in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to controlling modem memory used by uplink data). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to controlling modem memory used by uplink data). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of controlling modem memory used by uplink data as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. For example, the communications manager 720 may be configured as or otherwise support a means for receiving, from a base station, a control message indicating a resource configuration for uplink and downlink transmissions. The communications manager 720 may be configured as or otherwise support a means for determining an uplink buffer threshold for a modem buffer of the UE based on the resource configuration.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for more efficient utilization of communication resources, increased downlink throughput, and reduced memory usage.

Figure 8:
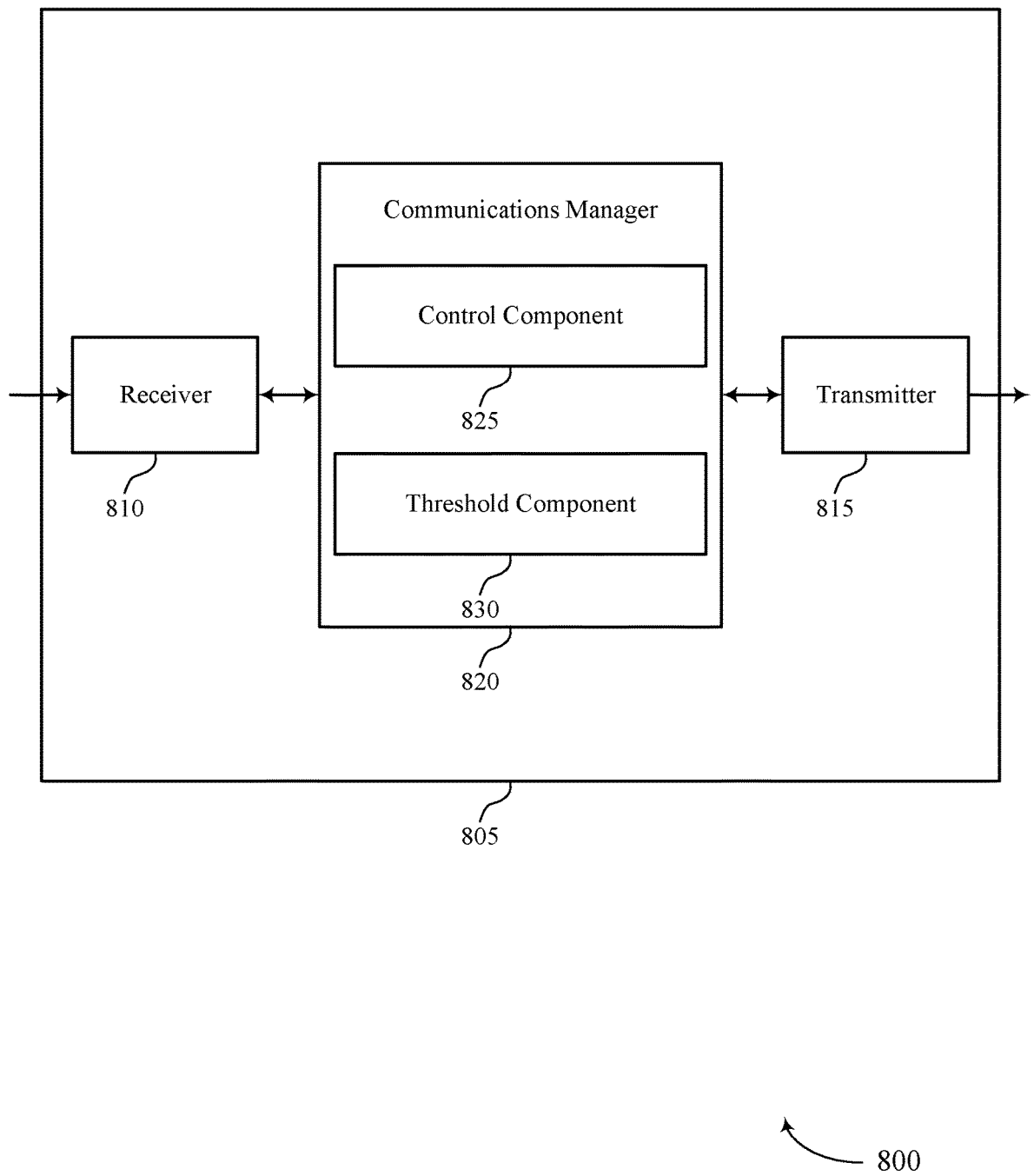

FIG. 8 shows a block diagram 800 of a device 805 that supports controlling modem memory used by uplink data in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to controlling modem memory used by uplink data). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to controlling modem memory used by uplink data). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of controlling modem memory used by uplink data as described herein. For example, the communications manager 820 may include a control component 825 a threshold component 830, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. The control component 825 may be configured as or otherwise support a means for receiving, from a base station, a control message indicating a resource configuration for uplink and downlink transmissions. The threshold component 830 may be configured as or otherwise support a means for determining an uplink buffer threshold for a modem buffer of the UE based on the resource configuration.

Figure 9:
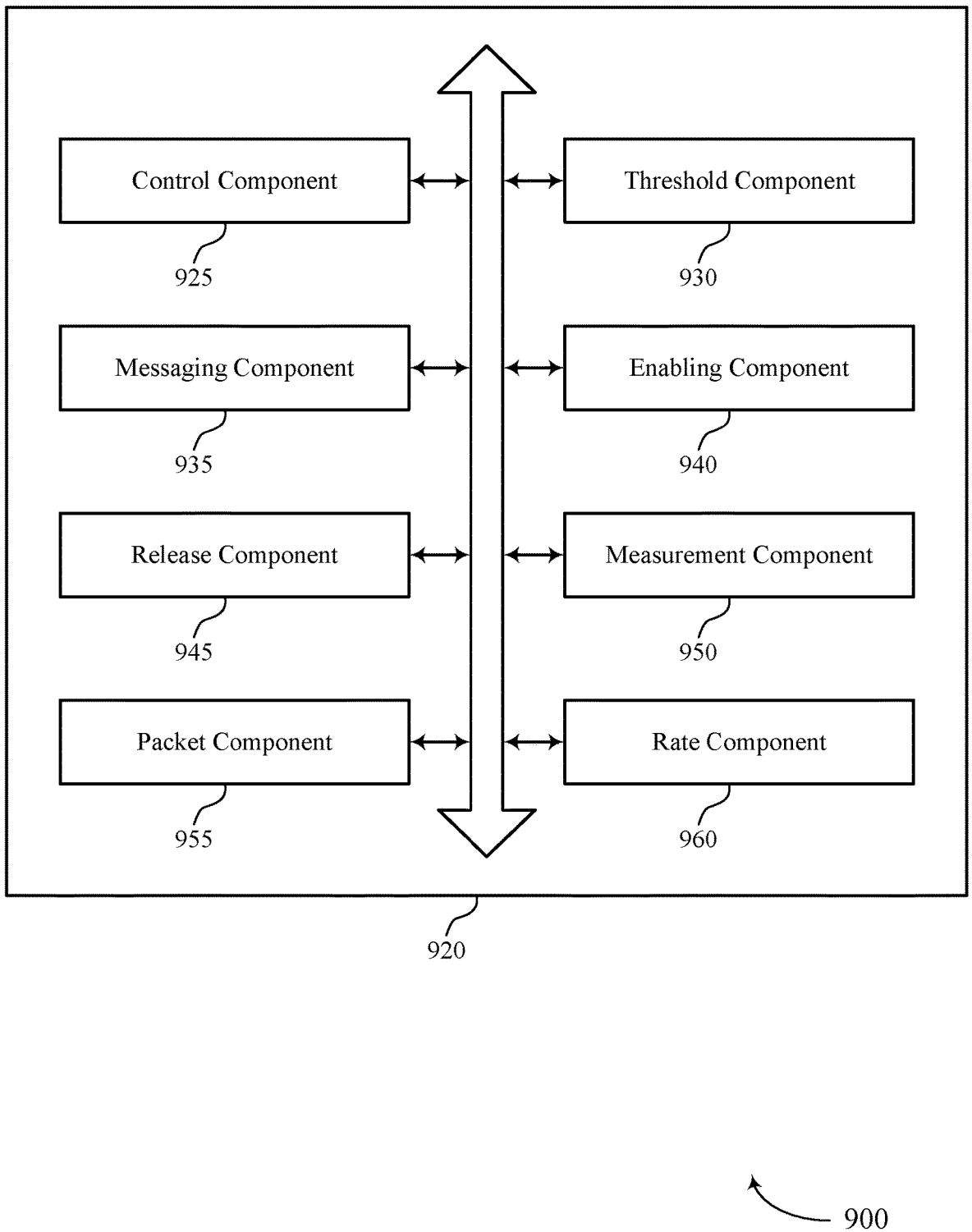
FIG. 9 shows a block diagram of a communications manager that supports controlling modem memory used by uplink data in accordance with aspects of the present disclosure.

FIG. 9 shows a block diagram 900 of a communications manager 920 that supports controlling modem memory used by uplink data in accordance with aspects of the present disclosure. The communications manager 920 may be an example of aspects of a communications manager 720, a communications manager 820, or both, as described herein. The communications manager 920, or various components thereof, may be an example of means for performing various aspects of controlling modem memory used by uplink data as described herein. For example, the communications manager 920 may include a control component 925, a threshold component 930, a messaging component 935, an enabling component 940, a release component 945, a measurement component 950, a packet component 955, a rate component 960, or any combination thereof. Each of these components may communicate, directly or indirectly, with one another (e.g., via one or more buses).

The communications manager 920 may support wireless communication at a UE in accordance with examples as disclosed herein. The control component 925 may be configured as or otherwise support a means for receiving, from a base station, a control message indicating a resource configuration for uplink and downlink transmissions. The threshold component 930 may be configured as or otherwise support a means for determining an uplink buffer threshold for a modem buffer of the UE based on the resource configuration.

In some examples, the messaging component 935 may be configured as or otherwise support a means for transmitting, to the base station, a feedback request message requesting that the base station provide feedback for at least one previously transmitted uplink packet based on a comparison of an amount of previously transmitted uplink data and scheduled uplink data stored in the modem buffer relative to the uplink buffer threshold.

In some examples, to support transmitting the feedback request message, the messaging component 935 may be configured as or otherwise support a means for transmitting the feedback request message including a packet identifier of a first previously transmitted uplink packet of the at least one previously transmitted uplink packet.

In some examples, the messaging component 935 may be configured as or otherwise support a means for receiving, based on transmitting the feedback request message, a feedback response message corresponding to a first previously transmitted uplink packet of the at least one previously transmitted uplink packet.

In some examples, to support transmitting the feedback request message, the messaging component 935 may be configured as or otherwise support a means for transmitting the feedback request message in accordance with a feedback request rate that is adjusted based on the amount of previously transmitted uplink data and scheduled uplink data satisfying the uplink buffer threshold, where the adjusted feedback request rate is different from an initial feedback request rate configured by RRC signaling.

In some examples, the messaging component 935 may be configured as or otherwise support a means for transmitting a set of multiple feedback request messages in accordance with the adjusted feedback request rate, the set of multiple feedback request messages including the feedback request message.

In some examples, the messaging component 935 may be configured as or otherwise support a means for receiving, in accordance with the adjusted feedback request rate, a set of multiple feedback response messages corresponding to the set of multiple feedback request messages.

In some examples, the packet component 955 may be configured as or otherwise support a means for retransmitting the at least one previously transmitted uplink packet, prior to receiving a feedback response message corresponding to the feedback request message, where a copy of the at least one previously transmitted uplink packet is stored in the modem buffer.

In some examples, to support retransmitting the at least one previously transmitted uplink packet, the packet component 955 may be configured as or otherwise support a means for retransmitting the at least one previously transmitted uplink packet via one or more radio bearers.

In some examples, to support retransmitting the at least one previously transmitted uplink packet, the packet component 955 may be configured as or otherwise support a means for retransmitting the at least one previously transmitted uplink packet during a transmission window.

In some examples, the packet component 955 may be configured as or otherwise support a means for storing a copy of each packet of the at least one previously transmitted uplink packet transmitted during the transmission window.

In some examples, the messaging component 935 may be configured as or otherwise support a means for receiving a feedback response message corresponding to the at least one previously transmitted uplink packet. In some examples, the packet component 955 may be configured as or otherwise support a means for removing the at least one previously transmitted uplink packet from the modem buffer based on the feedback response message.

In some examples, the enabling component 940 may be configured as or otherwise support a means for transmitting a disable command to a host of the UE requesting that the host stop forwarding uplink data to the modem buffer based on an amount of uplink data stored in the modem buffer satisfying the uplink buffer threshold.

In some examples, the enabling component 940 may be configured as or otherwise support a means for transmitting an enable command to a host of the UE requesting that the host forward uplink data to the modem buffer for transmission based on an amount of uplink data stored in the modem buffer failing to satisfy the uplink buffer threshold.

In some examples, the rate component 960 may be configured as or otherwise support a means for adjusting a feedback request rate based at least in part on the amount of uplink data stored in the modem buffer failing to satisfy the uplink buffer threshold.

In some examples, to support determining the uplink buffer threshold, the threshold component 930 may be configured as or otherwise support a means for determining the uplink buffer threshold based on a memory size of the modem buffer.

In some examples, to support determining the uplink buffer threshold, the threshold component 930 may be configured as or otherwise support a means for determining the uplink buffer threshold based on a throughput, a priority, or a latency, or any combination thereof, associated with uplink transmissions, downlink transmissions, or both, where at least one of the throughput, the priority, or the latency is indicated in the resource configuration or via a host of the UE.

In some examples, to support determining the uplink buffer threshold, the threshold component 930 may be configured as or otherwise support a means for determining the uplink buffer threshold based on an uplink application data throughput, a downlink application data throughput, or both, for an application of the UE.

In some examples, the release component 945 may be configured as or otherwise support a means for transmitting a release command for a first cell group based on an amount of previously transmitted uplink data and scheduled uplink data stored in the modem buffer satisfying the uplink buffer threshold.

In some examples, the packet component 955 may be configured as or otherwise support a means for retransmitting, via a second cell group, a first uplink packet of at least one previously transmitted uplink packet that was previously transmitted via the first cell group based on the release command.

In some examples, the measurement component 950 may be configured as or otherwise support a means for transmitting a first measurement result for a first cell group that includes an adjustment to a second measurement result for the first cell group based on an amount of previously transmitted uplink data and scheduled uplink data stored in the modem buffer satisfying the uplink buffer threshold.

In some examples, the measurement component 950 may be configured as or otherwise support a means for transmitting an unmodified measurement result for a first cell group based on an amount of previously transmitted uplink data and scheduled uplink data stored in the modem buffer failing to satisfy the uplink buffer threshold.

In some examples, the messaging component 935 may be configured as or otherwise support a means for transmitting a reestablishment request for a cell group based on an amount of previously transmitted uplink data and scheduled uplink data stored in the modem buffer failing to satisfy the uplink buffer threshold.

Figure 10:
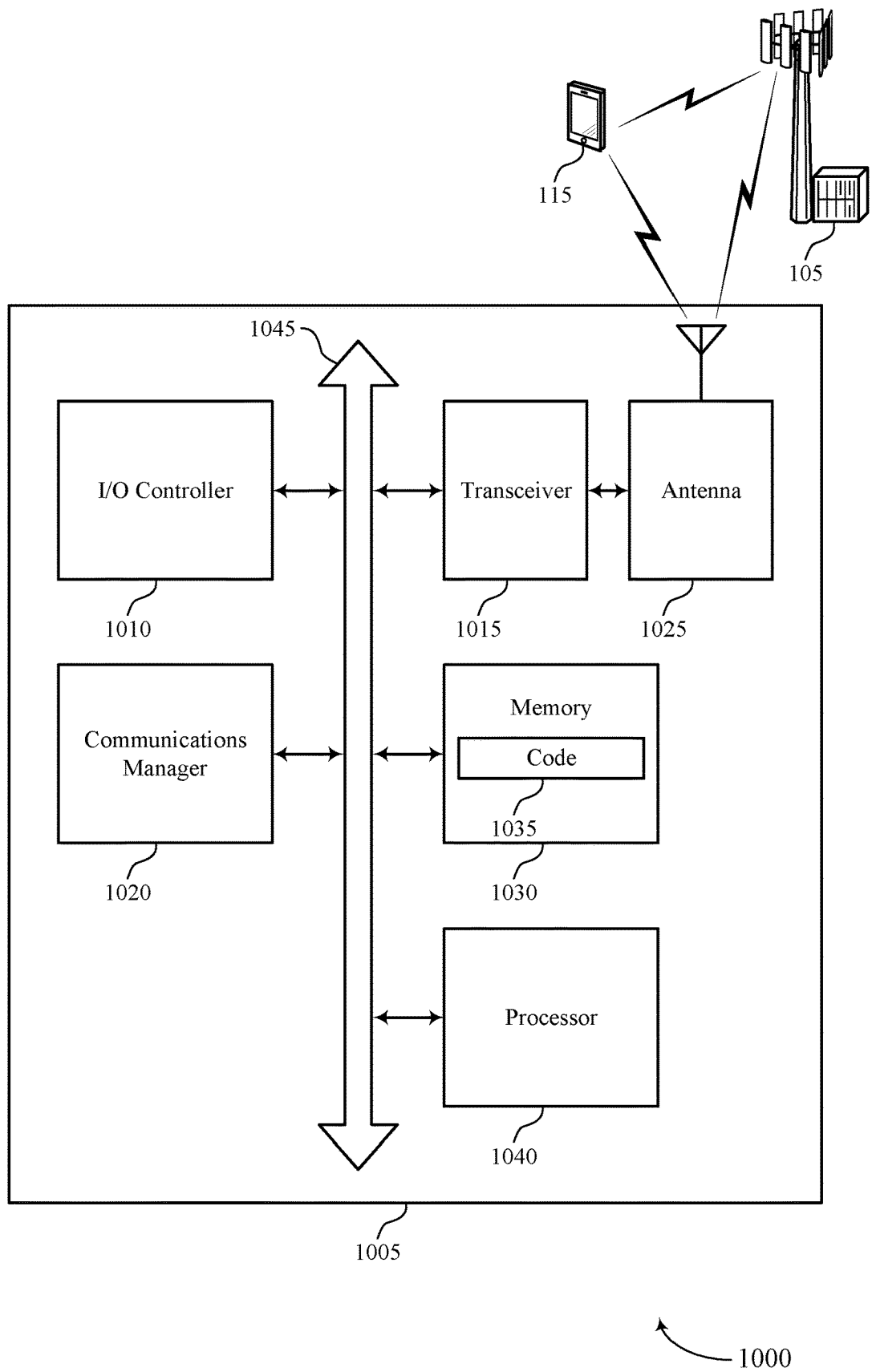
FIG. 10 shows a diagram of a system including a device that supports controlling modem memory used by uplink data in accordance with aspects of the present disclosure.

FIG. 10 shows a diagram of a system 1000 including a device 1005 that supports controlling modem memory used by uplink data in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include RAM and ROM. The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting controlling modem memory used by uplink data). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for receiving, from a base station, a control message indicating a resource configuration for uplink and downlink transmissions. The communications manager 1020 may be configured as or otherwise support a means for determining an uplink buffer threshold for a modem buffer of the UE based on the resource configuration.

By including or configuring the communications manager 1020 in accordance with examples as described herein, the device 1005 may support techniques for device-level advantages (e.g., improved communication reliability, reduced latency, improved user experience related to reduced processing, more efficient utilization of communication resources, improved coordination between devices, longer battery life, improved utilization of processing capability, increased downlink throughput, and reduced memory usage).

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of controlling modem memory used by uplink data as described herein, or the processor 1040 and the memory 1030 may be otherwise configured to perform or support such operations.

Figure 11:
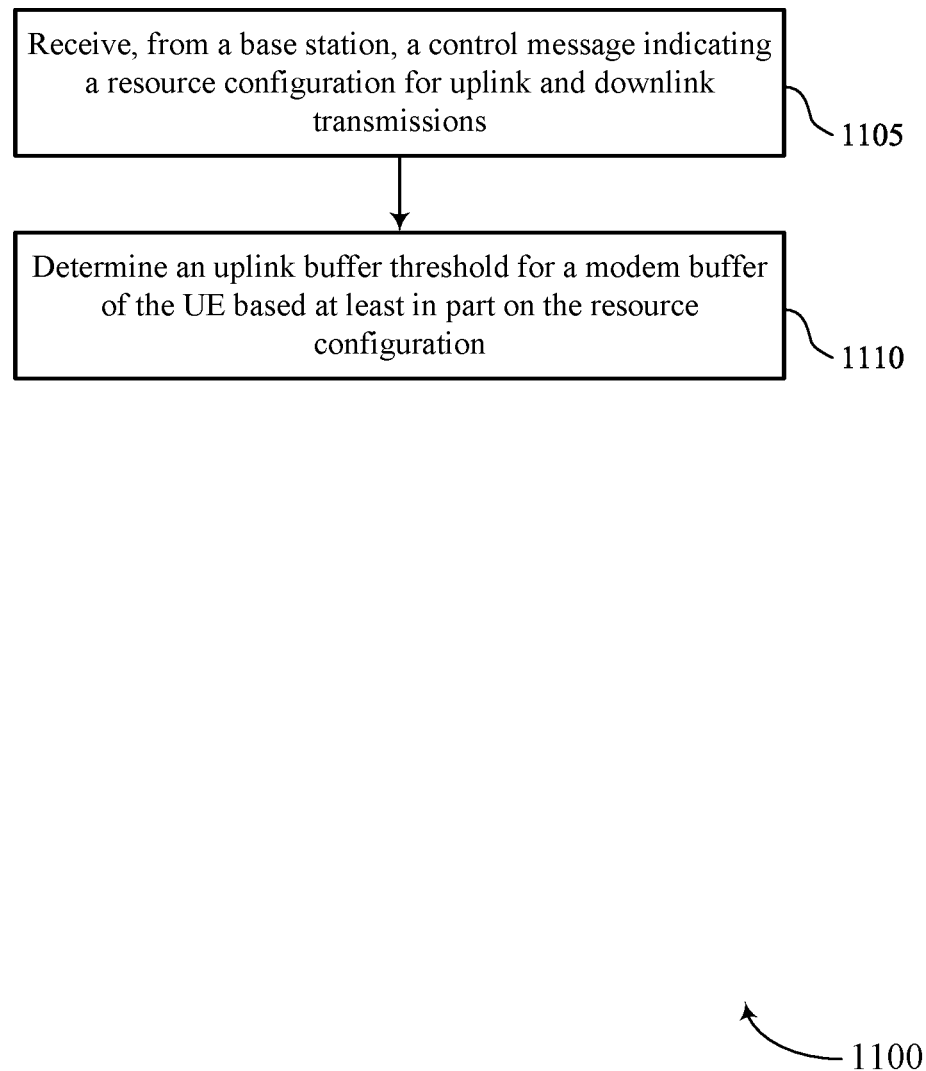
FIGS. 11 through 13 show flowcharts illustrating methods that support controlling modem memory used by uplink data in accordance with aspects of the present disclosure.

FIG. 11 shows a flowchart illustrating a method 1100 that supports controlling modem memory used by uplink data in accordance with aspects of the present disclosure. The operations of the method 1100 may be implemented by a UE or its components as described herein. For example, the operations of the method 1100 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1105, the method may include receiving, from a base station, a control message indicating a resource configuration for uplink and downlink transmissions. The operations of 1105 may be performed in accordance with examples as disclosed herein. In some examples, aspects of the operations of 1105 may be performed by a control component 925 as described with reference to FIG. 9.

At 1110, the method may include determining an uplink buffer threshold for a modem buffer of the UE based on the resource configuration. The operations of 1110 may be performed in accordance with examples as disclosed herein. In some examples, aspects of the operations of 1110 may be performed by a threshold component 930 as described with reference to FIG. 9.

Figure 12:
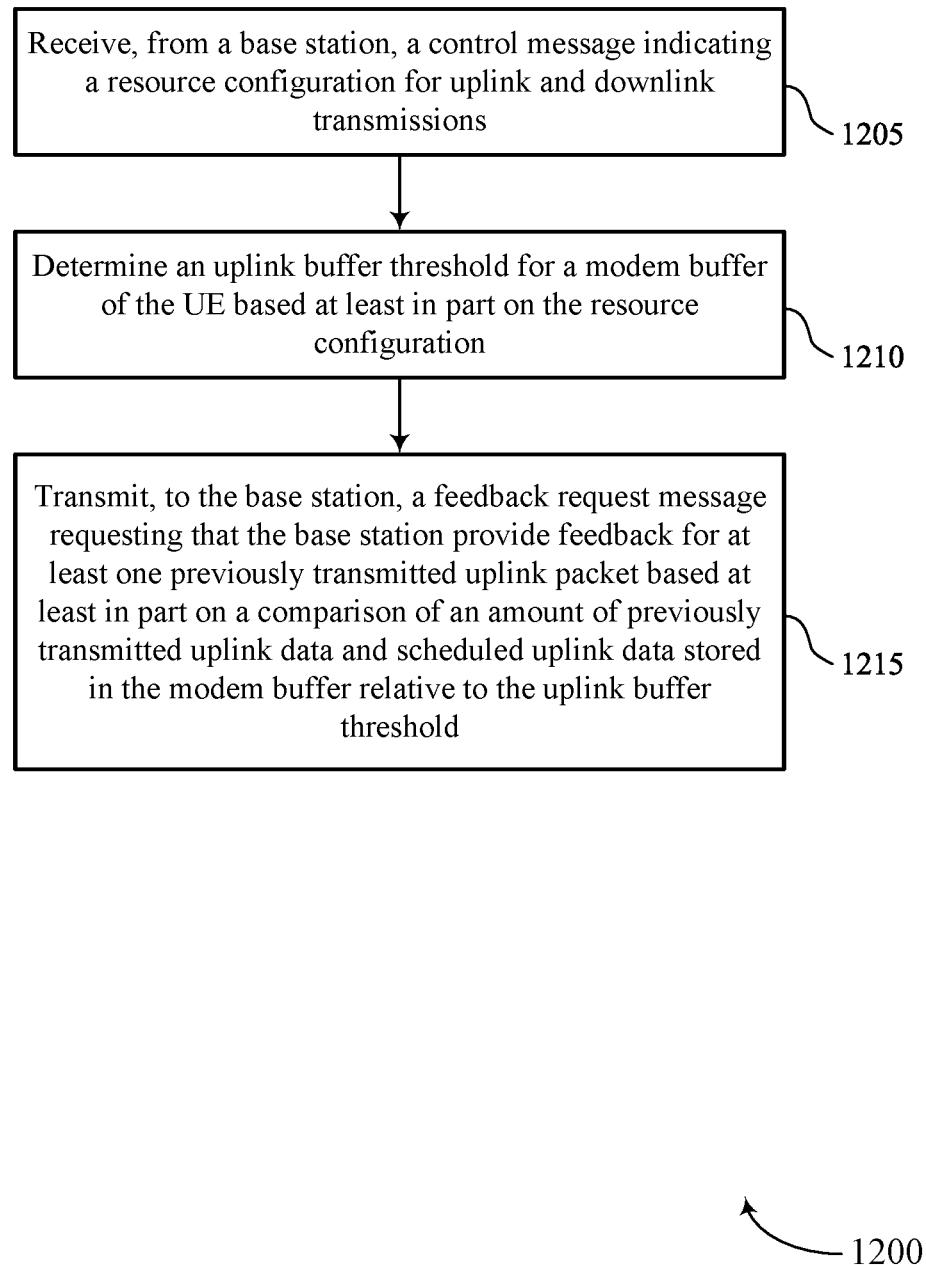

FIG. 12 shows a flowchart illustrating a method 1200 that supports controlling modem memory used by uplink data in accordance with aspects of the present disclosure. The operations of the method 1200 may be implemented by a UE or its components as described herein. For example, the operations of the method 1200 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1205, the method may include receiving, from a base station, a control message indicating a resource configuration for uplink and downlink transmissions. The operations of 1205 may be performed in accordance with examples as disclosed herein. In some examples, aspects of the operations of 1205 may be performed by a control component 925 as described with reference to FIG. 9.

At 1210, the method may include determining an uplink buffer threshold for a modem buffer of the UE based on the resource configuration. The operations of 1210 may be performed in accordance with examples as disclosed herein. In some examples, aspects of the operations of 1210 may be performed by a threshold component 930 as described with reference to FIG. 9.

At 1215, the method may include transmitting, to the base station, a feedback request message requesting that the base station provide feedback for at least one previously transmitted uplink packet based on a comparison of an amount of previously transmitted uplink data and scheduled uplink data stored in the modem buffer relative to the uplink buffer threshold. The operations of 1215 may be performed in accordance with examples as disclosed herein. In some examples, aspects of the operations of 1215 may be performed by a messaging component 935 as described with reference to FIG. 9.

Figure 13:
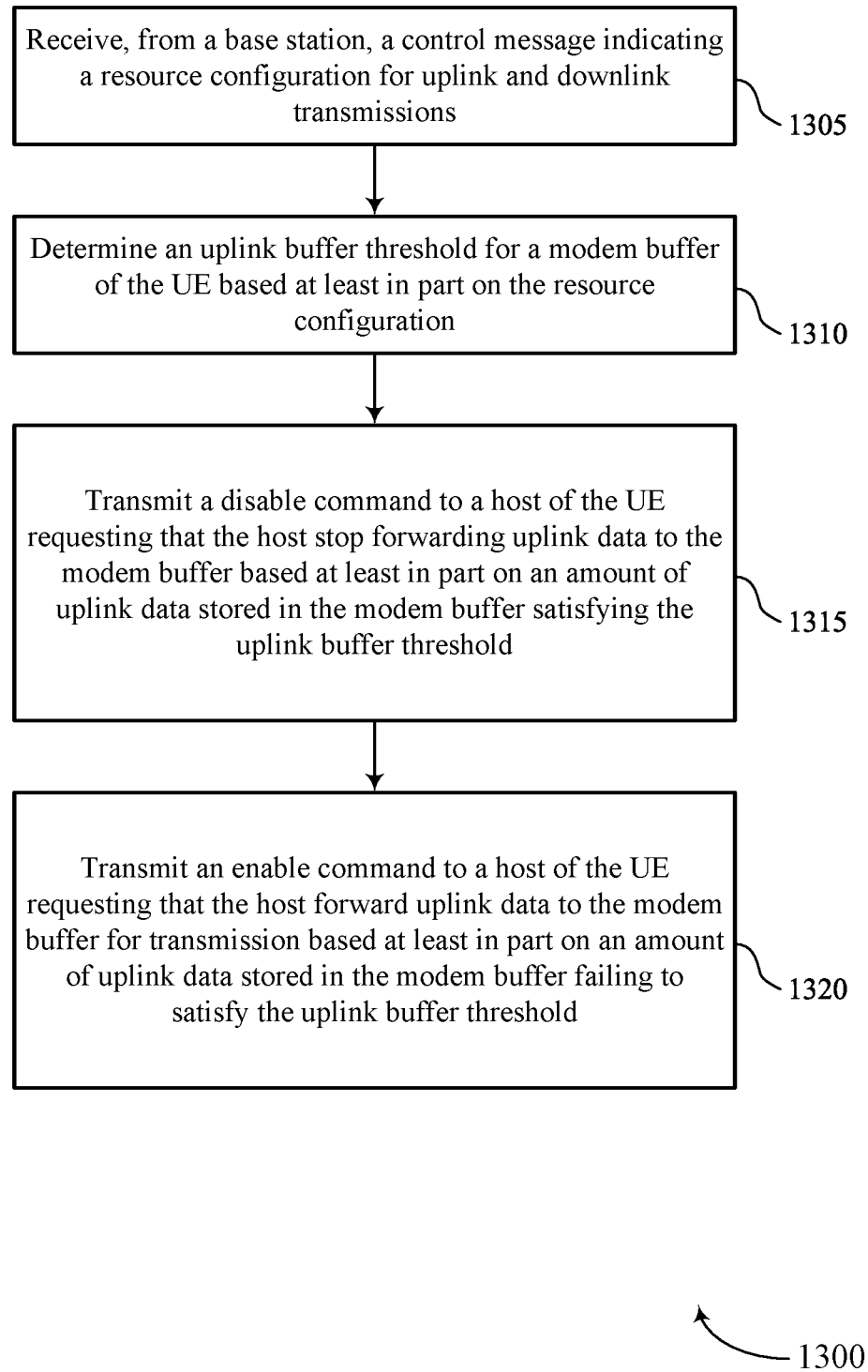

FIG. 13 shows a flowchart illustrating a method 1300 that supports controlling modem memory used by uplink data in accordance with aspects of the present disclosure. The operations of the method 1300 may be implemented by a UE or its components as described herein. For example, the operations of the method 1300 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, a control message indicating a resource configuration for uplink and downlink transmissions. The operations of 1305 may be performed in accordance with examples as disclosed herein. In some examples, aspects of the operations of 1305 may be performed by a control component 925 as described with reference to FIG. 9.

At 1310, the method may include determining an uplink buffer threshold for a modem buffer of the UE based on the resource configuration. The operations of 1310 may be performed in accordance with examples as disclosed herein. In some examples, aspects of the operations of 1310 may be performed by a threshold component 930 as described with reference to FIG. 9.

At 1315, the method may include transmitting a disable command to a host of the UE requesting that the host stop forwarding uplink data to the modem buffer based on an amount of uplink data stored in the modem buffer satisfying the uplink buffer threshold. The operations of 1315 may be performed in accordance with examples as disclosed herein. In some examples, aspects of the operations of 1315 may be performed by an enabling component 940 as described with reference to FIG. 9.

At 1320, the method may include transmitting an enable command to a host of the UE requesting that the host forward uplink data to the modem buffer for transmission based on an amount of uplink data stored in the modem buffer failing to satisfy the uplink buffer threshold. The operations of 1320 may be performed in accordance with examples as disclosed herein. In some examples, aspects of the operations of 1320 may be performed by an enabling component 940 as described with reference to FIG. 9.

The following provides an overview of aspects of the present disclosure:

Aspect 1: A method for wireless communication at a UE, comprising: receiving, from a base station, a control message indicating a resource configuration for uplink and downlink transmissions; and determining an uplink buffer threshold for a modem buffer of the UE based at least in part on the resource configuration.

Aspect 2: The method of aspect 1, further comprising: transmitting, to the base station, a feedback request message requesting that the base station provide feedback for at least one previously transmitted uplink packet based at least in part on a comparison of an amount of previously transmitted uplink data and scheduled uplink data stored in the modem buffer relative to the uplink buffer threshold.

Aspect 3: The method of aspect 2, wherein transmitting the feedback request message comprises: transmitting the feedback request message in accordance with a feedback request rate that is adjusted based at least in part on the amount of previously transmitted uplink data and scheduled uplink data satisfying the uplink buffer threshold, wherein the adjusted feedback request rate is different from an initial feedback request rate configured by RRC signaling.

Aspect 4: The method of aspect 3, further comprising: transmitting a plurality of feedback request messages in accordance with the adjusted feedback request rate, the plurality of feedback request messages comprising the feedback request message.

Aspect 5: The method of aspect 4, further comprising: receiving, in accordance with the adjusted feedback request rate, a plurality of feedback response messages corresponding to the plurality of feedback request messages.

Aspect 6: The method of any of aspects 1 through 5, further comprising: retransmitting at least one previously transmitted uplink packet, prior to receiving a feedback response message corresponding to a feedback request message requesting that the base station provide feedback for the at least one previously transmitted uplink packet, wherein a copy of the at least one previously transmitted uplink packet is stored in the modem buffer.

Aspect 7: The method of aspect 6, wherein retransmitting the at least one previously transmitted uplink packet comprises: retransmitting the at least one previously transmitted uplink packet via one or more radio bearers.

Aspect 8: The method of any of aspects 6 through 7, wherein retransmitting the at least one previously transmitted uplink packet comprises: retransmitting the at least one previously transmitted uplink packet during a transmission window.

Aspect 9: The method of aspect 8, further comprising: storing a copy of each packet of the at least one previously transmitted uplink packet transmitted during the transmission window.

Aspect 10: The method of any of aspects 6 through 9, further comprising: receiving a feedback response message corresponding to the at least one previously transmitted uplink packet; and removing the at least one previously transmitted uplink packet from the modem buffer based at least in part on the feedback response message.

Aspect 11: The method of any of aspects 1 through 10, further comprising: transmitting a disable command to a host of the UE requesting that the host stop forwarding uplink data to the modem buffer, pausing read or write operations at the modem buffer, or both, based at least in part on an amount of uplink data stored in the modem buffer satisfying the uplink buffer threshold.

Aspect 12: The method of any of aspects 1 through 11, further comprising: transmitting an enable command to a host of the UE requesting that the host forward uplink data to the modem buffer for transmission based at least in part on an amount of uplink data stored in the modem buffer failing to satisfy the uplink buffer threshold.

Aspect 13: The method of aspect 12, further comprising: adjusting a feedback request rate based at least in part on the amount of uplink data stored in the modem buffer failing to satisfy the uplink buffer threshold.

Aspect 14: The method of any of aspects 1 through 13, wherein determining the uplink buffer threshold further comprises: determining the uplink buffer threshold based at least in part on a memory size of the modem buffer.

Aspect 15: The method of any of aspects 1 through 14, wherein determining the uplink buffer threshold further comprises: determining the uplink buffer threshold based at least in part on a throughput, a priority, or a latency, or any combination thereof, associated with uplink transmissions, downlink transmissions, or both, wherein at least one of the throughput, the priority, or the latency is indicated in the resource configuration or via a host of the UE.

Aspect 16: The method of any of aspects 1 through 15, wherein determining the uplink buffer threshold further comprises: determining the uplink buffer threshold based at least in part on an uplink application data throughput, a downlink application data throughput, or both, for an application of the UE.

Aspect 17: The method of any of aspects 1 through 16, further comprising: transmitting a release command for a first cell group based at least in part on an amount of previously transmitted uplink data and scheduled uplink data stored in the modem buffer satisfying the uplink buffer threshold.

Aspect 18: The method of aspect 17, further comprising: retransmitting, via a second cell group, a first uplink packet of at least one previously transmitted uplink packet that was previously transmitted via the first cell group based at least in part on the release command.

Aspect 19: The method of any of aspects 1 through 18, further comprising: transmitting a first measurement result for a first cell group that comprises an adjustment to a second measurement result for the first cell group based at least in part on an amount of previously transmitted uplink data and scheduled uplink data stored in the modem buffer satisfying the uplink buffer threshold.

Aspect 20: The method of any of aspects 1 through 19, further comprising: transmitting an unmodified measurement result for a first cell group based at least in part on an amount of previously transmitted uplink data and scheduled uplink data stored in the modem buffer failing to satisfy the uplink buffer threshold.

Aspect 21: The method of any of aspects 1 through 20, further comprising: transmitting a reestablishment request for a cell group based at least in part on an amount of previously transmitted uplink data and scheduled uplink data stored in the modem buffer failing to satisfy the uplink buffer threshold.

Aspect 22: An apparatus for wireless communication at a UE, comprising a processor; memory coupled with the processor; and instructions stored in the memory and executable by the processor to cause the apparatus to perform a method of any of aspects 1 through 21.

Aspect 23: An apparatus for wireless communication at a UE, comprising at least one means for performing a method of any of aspects 1 through 21.

Aspect 24: A non-transitory computer-readable medium storing code for wireless communication at a UE, the code comprising instructions executable by a processor to perform a method of any of aspects 1 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, EEPROM, flash memory, CD ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving, from a base station, a control message indicating a resource configuration for uplink and downlink transmissions;
   determining an uplink buffer threshold for a modem buffer of the UE based at least in part on the resource configuration;
   transmitting, to the base station, a feedback request message in accordance with a feedback request rate, the feedback request message requesting that the base station provide feedback for at least one previously transmitted uplink packet based at least in part on a comparison of a sum to the uplink buffer threshold, wherein the sum is of a first amount of previously transmitted uplink data and a second amount of scheduled uplink data, and wherein the previously transmitted uplink data and the scheduled uplink data are stored in the modem buffer; and retransmitting the at least one previously transmitted uplink packet, prior to receiving a feedback response message corresponding to the feedback request message requesting that the base station provide feedback for the at least one previously transmitted uplink packet, wherein a copy of the at least one previously transmitted uplink packet is stored in the modem buffer.

2. The method of claim 1, wherein the feedback request rate is adjusted based at least in part on the sum of the first amount of previously transmitted uplink data and the second amount of scheduled uplink data satisfying the uplink buffer threshold, wherein the adjusted feedback request rate is different from an initial feedback request rate configured by radio resource control (RRC) signaling.

3. The method of claim 2, further comprising:
transmitting a plurality of feedback request messages in accordance with the adjusted feedback request rate, the plurality of feedback request messages comprising the feedback request message.

4. The method of claim 3, further comprising:
receiving, in accordance with the adjusted feedback request rate, a plurality of feedback response messages corresponding to the plurality of feedback request messages.

5. The method of claim 1, wherein retransmitting the at least one previously transmitted uplink packet comprises:
retransmitting the at least one previously transmitted uplink packet via one or more radio bearers.

6. The method of claim 1, wherein retransmitting the at least one previously transmitted uplink packet comprises:
retransmitting the at least one previously transmitted uplink packet during a transmission window.

7. The method of claim 6, further comprising:
storing a copy of each packet of the at least one previously transmitted uplink packet transmitted during the transmission window.

8. The method of claim 1, further comprising:
receiving the feedback response message corresponding to the at least one previously transmitted uplink packet; and
removing the at least one previously transmitted uplink packet from the modem buffer based at least in part on the feedback response message.

9. The method of claim 1, further comprising:
transmitting a disable command to a host of the UE requesting that the host stop forwarding uplink data to the modem buffer, pausing read or write operations at the modem buffer, or both, based at least in part on an amount of uplink data stored in the modem buffer satisfying the uplink buffer threshold.

10. The method of claim 1, further comprising:
transmitting an enable command to a host of the UE requesting that the host forward uplink data to the modem buffer for transmission based at least in part on an amount of uplink data stored in the modem buffer failing to satisfy the uplink buffer threshold.

11. The method of claim 10, further comprising:
adjusting the feedback request rate based at least in part on the amount of uplink data stored in the modem buffer failing to satisfy the uplink buffer threshold.

12. The method of claim 1, wherein determining the uplink buffer threshold further comprises:
determining the uplink buffer threshold based at least in part on a memory size of the modem buffer.

13. The method of claim 1, wherein determining the uplink buffer threshold further comprises:
determining the uplink buffer threshold based at least in part on a throughput, a priority, or a latency, or any combination thereof, associated with uplink transmissions, downlink transmissions, or both, wherein at least one of the throughput, the priority, or the latency is indicated in the resource configuration or via a host of the UE.

14. The method of claim 1, wherein determining the uplink buffer threshold further comprises:
determining the uplink buffer threshold based at least in part on an uplink application data throughput, a downlink application data throughput, or both, for an application of the UE.

15. The method of claim 1, further comprising:
transmitting a release command for a first cell group based at least in part on the sum of the first amount of previously transmitted uplink data and the second amount of scheduled uplink data stored in the modem buffer satisfying the uplink buffer threshold.

16. The method of claim 15, further comprising:
retransmitting, via a second cell group, a first uplink packet of the at least one previously transmitted uplink packet that was previously transmitted via the first cell group based at least in part on the release command.

17. The method of claim 1, further comprising:
transmitting a first measurement result for a first cell group that comprises an adjustment to a second measurement result for the first cell group based at least in part on the sum of the first amount of previously transmitted uplink data and the second amount of scheduled uplink data stored in the modem buffer satisfying the uplink buffer threshold.

18. The method of claim 1, further comprising:
transmitting an unmodified measurement result for a first cell group based at least in part on the sum of the first amount of previously transmitted uplink data and the second amount of scheduled uplink data stored in the modem buffer failing to satisfy the uplink buffer threshold.

19. The method of claim 1, further comprising:
transmitting a reestablishment request for a cell group based at least in part on the sum of the first amount of previously transmitted uplink data and the second amount of scheduled uplink data stored in the modem buffer failing to satisfy the uplink buffer threshold.

20. The method of claim 1, wherein the first amount of previously transmitted uplink data is based at least in part on a second sum of one or more previously transmitted uplink packets over one or more radio bearers, over one or more radio link control entities, or both.

21. The method of claim 1, wherein determining the uplink buffer threshold further comprises:
determining the uplink buffer threshold based at least in part on a product of a maximum amount of memory for storing previously transmitted uplink data and scheduled uplink data and a threshold value.

22. The method of claim 1, wherein determining the uplink buffer threshold further comprises:
determining the uplink buffer threshold based at least in part on a margin value.

23. The method of claim 22, wherein the margin value is based at least in part on a quantity of unusable memory blocks.

24. An apparatus for wireless communication at a user equipment (UE), comprising:

at least one processor; and at least one memory coupled with the at least one processor, with instructions stored in the at least one memory, the instructions being executable by the at least one processor, individually or in any combination, to cause the apparatus to:

receive, from a base station, a control message indicating a resource configuration for uplink and downlink transmissions;

determine an uplink buffer threshold for a modem buffer of the UE based at least in part on the resource configuration;

transmit, to the base station, a feedback request message in accordance with a feedback request rate, the feedback request message requesting that the base station provide feedback for at least one previously transmitted uplink packet based at least in part on a comparison of a sum to the uplink buffer threshold, wherein the sum is of a first amount of previously transmitted uplink data and a second amount of scheduled uplink data, and wherein the previously transmitted uplink data and the scheduled uplink data are stored in the modem buffer; and retransmit the at least one previously transmitted uplink packet, prior to receiving a feedback response message corresponding to the feedback request message requesting that the base station provide feedback for the at least one previously transmitted uplink packet, wherein a copy of the at least one previously transmitted uplink packet is stored in the modem buffer.

25. The apparatus of claim 24, wherein the feedback request rate is adjusted based at least in part on the sum of the first amount of previously transmitted uplink data and the second amount of scheduled uplink data satisfying the uplink buffer threshold, wherein the adjusted feedback request rate is different from an initial feedback request rate configured by radio resource control (RRC) signaling.

26. The apparatus of claim 25, wherein the instructions are further executable by the at least one processor to cause the apparatus to:

transmit a plurality of feedback request messages in accordance with the adjusted feedback request rate, the plurality of feedback request messages comprising the feedback request message.

27. The apparatus of claim 26, wherein the instructions are further executable by the at least one processor to cause the apparatus to:

receive, in accordance with the adjusted feedback request rate, a plurality of feedback response messages corresponding to the plurality of feedback request messages.

28. An apparatus for wireless communication at a user equipment (UE), comprising:

means for receiving, from a base station, a control message indicating a resource configuration for uplink and downlink transmissions;

means for determining an uplink buffer threshold for a modem buffer of the UE based at least in part on the resource configuration;

means for transmitting, to the base station, a feedback request message in accordance with a feedback request rate, the feedback request message requesting that the base station provide feedback for at least one previously transmitted uplink packet based at least in part on a comparison of a sum to the uplink buffer threshold, wherein the sum is of a first amount of previously transmitted uplink data and a second amount of scheduled uplink data, and wherein the previously transmitted uplink data and the scheduled uplink data are stored in the modem buffer; and means for retransmitting the at least one previously transmitted uplink packet, prior to receiving a feedback response message corresponding to the feedback request message requesting that the base station provide feedback for the at least one previously transmitted uplink packet, wherein a copy of the at least one previously transmitted uplink packet is stored in the modem buffer.

29. A non-transitory computer-readable medium storing code for wireless communication at a user equipment (UE), the code comprising instructions executable by at least one processor to:

receive, from a base station, a control message indicating a resource configuration for uplink and downlink transmissions;

determine an uplink buffer threshold for a modem buffer of the UE based at least in part on the resource configuration;

transmit, to the base station, a feedback request message in accordance with a feedback request rate, the feedback request message requesting that the base station provide feedback for at least one previously transmitted uplink packet based at least in part on a comparison of a sum to the uplink buffer threshold, wherein the sum is of a first amount of previously transmitted uplink data and a second amount of scheduled uplink data, and wherein the previously transmitted uplink data and the scheduled uplink data are stored in the modem buffer; and retransmit the at least one previously transmitted uplink packet, prior to receiving a feedback response message corresponding to the feedback request message requesting that the base station provide feedback for the at least one previously transmitted uplink packet, wherein a copy of the at least one previously transmitted uplink packet is stored in the modem buffer.

* * * * *